United States Patent
Ding et al.

(10) Patent No.: US 12,089,164 B2
(45) Date of Patent: Sep. 10, 2024

(54) TRANSMIT POWER CONTROL METHOD BASED ON AN UPLINK-DOWNLINK CONFIGURATION, RELATED DEVICE, AND SYSTEM

(71) Applicant: Huawei Technologies Co., Ltd., Shenzhen (CN)

(72) Inventors: Rentian Ding, Shanghai (CN); Feng Qian, Shanghai (CN); Yi Sui, Shanghai (CN); Yipan Zhou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 395 days.

(21) Appl. No.: 17/608,341

(22) PCT Filed: Apr. 24, 2020

(86) PCT No.: PCT/CN2020/086672
§ 371 (c)(1),
(2) Date: Nov. 2, 2021

(87) PCT Pub. No.: WO2020/224451
PCT Pub. Date: Nov. 12, 2020

(65) Prior Publication Data
US 2022/0264470 A1 Aug. 18, 2022

(30) Foreign Application Priority Data
May 3, 2019 (CN) .......................... 201910375078.4

(51) Int. Cl.
*H04W 52/14* (2009.01)
*H04W 52/36* (2009.01)
(Continued)

(52) U.S. Cl.
CPC .......... *H04W 52/14* (2013.01); *H04W 52/365* (2013.01); *H04W 52/367* (2013.01); *H04W 72/23* (2023.01); *H04W 76/20* (2018.02)

(58) Field of Classification Search
CPC ............... H04W 52/14; H04W 52/365; H04W 52/367; H04W 72/23; H04W 76/20;
(Continued)

(56) References Cited

U.S. PATENT DOCUMENTS

| | | | |
|---|---|---|---|
| 2011/0222469 A1 | 9/2011 | Ali et al. | |
| 2011/0292826 A1* | 12/2011 | Ahn ..................... | H04W 52/248 370/252 |

(Continued)

FOREIGN PATENT DOCUMENTS

| | | |
|---|---|---|
| CN | 102791020 A | 11/2012 |
| CN | 103299565 A | 9/2013 |

(Continued)

OTHER PUBLICATIONS

Oppo, et al., "Discussion on the FR2 duty cycle capability default value," 3GPP TSG-RAN WG4 Meeting #90bis, Xian, China, Apr. 8-12, 2019, R4-1903047, 2 pages.

*Primary Examiner* — Kiet Tang
(74) *Attorney, Agent, or Firm* — Conley Rose, P.C.

(57) ABSTRACT

A transmit power control method includes obtaining an uplink-downlink configuration (uplink (UL)/downlink (DL) assignment) from a network side and determining a power decrease that can be reduced in the uplink-downlink configuration compared with that in an all-uplink configuration when and uplink time proportion configured in the uplink-downlink configuration is not 100% and the uplink-downlink configuration is not the all-uplink configuration.

20 Claims, 11 Drawing Sheets

(51) Int. Cl.
*H04W 72/23* (2023.01)
*H04W 76/20* (2018.01)

(58) Field of Classification Search
CPC ............... H04W 72/51; H04W 52/146; H04W 52/0209; H04W 52/283; H04W 72/0446; H04W 52/248; H04W 52/228; H04L 5/14
See application file for complete search history.

(56) References Cited

U.S. PATENT DOCUMENTS

| | | | |
|---|---|---|---|
| 2012/0071195 A1* | 3/2012 | Chakraborty | ....... H04W 52/228 455/522 |
| 2012/0176967 A1 | 7/2012 | Kim et al. | |
| 2012/0295655 A1 | 11/2012 | Hsieh | |
| 2013/0100910 A1 | 4/2013 | Ali et al. | |
| 2016/0270001 A1 | 9/2016 | Hao et al. | |
| 2017/0332333 A1* | 11/2017 | Santhanam | ............... H04L 5/14 |
| 2021/0160787 A1 | 5/2021 | Zhou et al. | |

FOREIGN PATENT DOCUMENTS

| | | |
|---|---|---|
| CN | 103329602 A | 9/2013 |
| CN | 104378460 A | 2/2015 |
| CN | 107231682 A | 10/2017 |
| CN | 107528957 A | 12/2017 |
| CN | 108601073 A | 9/2018 |
| CN | 108702709 A | 10/2018 |
| CN | 109155976 A | 1/2019 |
| CN | 110225575 A | 9/2019 |
| WO | 2017197096 A1 | 11/2017 |

* cited by examiner

| Uplink-downlink configuration (Uplink-downlink configuration) | Downlink-to-uplink switch-point periodicity (Downlink-to-uplink switch-point periodicity) | Subframe number (Subframe number) | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 3

TRANSMIT POWER CONTROL METHOD BASED ON AN UPLINK-DOWNLINK CONFIGURATION, RELATED DEVICE, AND SYSTEM

CROSS-REFERENCE TO RELATED APPLICATIONS

This is a U.S. National Stage of International Patent Application No. PCT/CN2020/086672 filed on Apr. 24, 2020, which claims priority to Chinese Patent Application No. 201910375078.4 filed on May 3, 2019. Both of the aforementioned applications are hereby incorporated by reference in their entireties.

TECHNICAL FIELD

This application relates to the field of wireless communications technologies, and in particular, to a transmit power control method, a related device, and a system.

BACKGROUND

A specific absorption rate (specific absorption rate, SAR) is a standard measure, and is used to measure a human tissue's absorption of electromagnetic energy generated by a terminal product such as a mobile phone. A unit of the SAR is W/Kg (watts/Kg). A larger SAR indicates a greater impact of electromagnetic radiation on a human body, and a smaller SAR indicates a smaller impact. At present, some regulatory institutes have set up specific absorption rate specifications and set SAR limits. The SAR limit is a maximum amount of electromagnetic energy allowed to be absorbed per kilogram of human tissue within 6 minutes. For example, the Federal Communications Commission (Federal Communication Commission, FCC) has set a SAR limit to 1.6 W/Kg, and the European Telecommunications Standard Institute (European Telecommunications Standard Institute, ESTI) has set a SAR limit to 2.0 W/Kg.

Currently, the SAR limit is complied with by decreasing a transmit power of a terminal. However, in the conventional technology, to ensure that the SAR limit can be complied with in various service scenarios, a transmit power that needs to be decreased is determined in a strict scenario such as a continuous uplink transmission scenario, and transmission characteristics of different service scenarios are not considered differently.

SUMMARY

This application provides a transmit power control method, a related device, and a system. A terminal may determine an actual power decrease based on an uplink-downlink configuration delivered by a network side, so that the terminal can obtain more power headroom during uplink transmission. In this way, transmission performance is improved, and a specific absorption rate specification is also met.

According to a first aspect, this application provides a transmit power control method. The method is applied to a terminal (for example, a mobile phone) side, and may include: A terminal receives first information sent by a network device, where the first information indicates a first uplink-downlink configuration. Then, the terminal performs uplink transmission on some or all of uplink time resources indicated by the first uplink-downlink configuration. An actual transmit power for the uplink transmission is equal to a maximum transmit power of the terminal minus an actual power decrease and meets a specific absorption rate specification. The actual power decrease is calculated based on a first power decrease and a first power increase, and the actual power decrease is less than the first power decrease.

The first power increase is equal to a difference between a maximum transmit power that meets the specific absorption rate specification in the first uplink-downlink configuration and a maximum transmit power that meets the specific absorption rate specification in a second uplink-downlink configuration. A first uplink time proportion determined in the first uplink-downlink configuration is less than a second uplink time proportion determined in the second uplink-downlink configuration. The first power decrease is used to decrease, when the terminal is at a first distance from a human body in the second uplink-downlink configuration, a transmit power from the maximum transmit power of the terminal to the maximum transmit power that meets the specific absorption rate specification.

According to a second aspect, this application provides a transmit power control method. The method is applied to a network device (for example, a gNB) side, and may include: A network device sends first information to a terminal, where the first information indicates a first uplink-downlink configuration. Then, the network device may receive an uplink signal transmitted by the terminal.

Herein, an actual transmit power for transmitting the uplink signal by the terminal is equal to a maximum transmit power of the terminal minus an actual power decrease and meets a specific absorption rate specification. The actual power decrease is calculated based on a first power decrease and a first power increase, and the actual power decrease is less than the first power decrease. For descriptions of the first power decrease and the first power increase, refer to the first aspect. Details are not described herein again.

In the first aspect or the second aspect, the first uplink-downlink configuration may indicate assignment of uplink time resources and downlink time resources within a period of time, for example, indicate which subframes are UL subframes and which subframes are DL subframes in a configuration periodicity. For an uplink-downlink configuration, refer to the foregoing content. Details are not described herein again.

In the first aspect or the second aspect, a first mapping table may include a plurality of candidate distances and power decreases (deltas 1 for short) corresponding to the plurality of candidate distances. The first mapping table may be obtained according to step 1 in the conventional technology shown in FIG. 2. A second mapping table may include a plurality of candidate uplink time proportions and power increases (deltas 2 for short) corresponding to the plurality of candidate uplink time proportions. A power increase corresponding to an uplink time proportion indicates a power by which a power for the uplink time proportion is less decreased compared with a power for an all-uplink configuration. Within a SAR evaluation periodicity (for example, 6 minutes), compared with continuous uplink transmission (an all-uplink configuration, and an uplink time proportion 100%), discontinuous uplink transmission (an uplink time proportion less than 100%) generates less electromagnetic radiation and requires a smaller power decrease. The delta 2 in the second mapping table may be an empirical value. For example, a transmit power for an uplink proportion 50% may be 3 dB less decreased compared with a transmit power for an uplink proportion 1000%. The delta 2 may alternatively be obtained through actual tests.

With reference to the first aspect or the second aspect, the second uplink-downlink configuration may be an all-uplink configuration, and in this case, the second uplink time proportion is 100%. The second uplink-downlink configuration is not limited to an extreme uplink configuration such as the all-uplink configuration. The second uplink-downlink configuration may alternatively be another uplink-downlink configuration with a large uplink time proportion, for example, an uplink time proportion 95%.

According to the methods described in the first aspect and the second aspect, the terminal may obtain an uplink-downlink configuration (UL/DL assignment) from a network side. If an uplink time proportion configured in the uplink-downlink configuration is not 100%, that is, if the uplink-downlink configuration is not an all-uplink (AllUplink) configuration, the terminal may determine a power decrease that can be reduced in the uplink-downlink configuration compared with that in the all-uplink configuration. A power decrease in the all-uplink configuration may be determined with reference to the existing method shown in FIG. 2. Finally, the terminal may decrease an uplink transmit power by using the reduced power decrease. In this way, compared with the conventional technology, in the power control method provided in this application, a transmit power can be increased, so that the terminal can obtain more power headroom during uplink transmission. In this way, transmission performance is improved, and a SAR specification is also met. With reference to the first aspect or the second aspect, in some embodiments, the terminal may detect a distance between the terminal and the human body by using a distance sensor, or may detect a distance between the terminal and the human body by using a radar ranging sensor, an infrared ranging sensor, or the like. Optionally, the terminal may further determine the distance between the terminal and the human body based on a use case (use case). For example, when it is determined that a user is making a call, and an earpiece of the terminal is turned on, the terminal may determine that a distance between the user and the terminal is within a specific distance range, for example, 0.1 mm to 1.0 mm. The use case is not limited to this example. The terminal may alternatively determine the distance between the user and the terminal based on another use case. This is not limited in this application.

With reference to the first aspect or the second aspect, in some embodiments, the terminal may find, from the first mapping table, a power decrease corresponding to the first distance. In this way, even in an extreme scenario in which the terminal performs continuous uplink transmission, the specific absorption rate specification can be met. That is, a power decrease determined through tests in this extreme scenario is a maximum power decrease because the power decrease can ensure that the specific absorption rate specification is also met in another scenario.

With reference to the first aspect or the second aspect, in some embodiments, the terminal may find, from the second mapping table based on the first uplink time proportion, a power increase (namely, a power that is less decreased, and the delta 2) corresponding to the first uplink time proportion.

With reference to the first aspect or the second aspect, in some embodiments, the first information may be carried in a system message (for example, a SIB 1), or may be carried in a higher layer message (for example, an RRC message), or may be carried in a PDCCH (for example, a DCI message).

With reference to the first aspect or the second aspect, in some embodiments, when a cell-specific semi-persistent UL/DL configuration is used as the first uplink-downlink configuration, the first information may be carried in the system message. In an LTE communications system, the first information may be a TDD-Config IE in a SIB 1. In an NR communications system, the first information may be a UL-DL-configuration-common IE and/or a UL-DL-configuration-common-Set2 IE in a SIB 1.

With reference to the first aspect or the second aspect, in some embodiments, when a user-specific semi-persistent UL/DL configuration is used as the first uplink-downlink configuration, the first information may be carried in the higher layer message. The first information may be a ServingCellConfig IE in the RRC message.

With reference to the first aspect or the second aspect, in some embodiments, when a dynamic UL/DL configuration is used as the first uplink-downlink configuration, the first information may be carried in the DCI message. The first information may be a ServingCellConfig IE in the RRC message.

With reference to the first aspect or the second aspect, in some embodiments, for a specific terminal, uplink time resources specifically occupied by uplink transmission need to be further indicated by an uplink grant (UL grant) delivered by the network device. Before receiving the first information, the terminal may further receive the UL grant sent by the network device, where the UL grant may be carried in the DCI message. The terminal may further determine, based on the UL grant, which part of the uplink time resources indicated by the first uplink-downlink configuration carry uplink data.

With reference to the first aspect or the second aspect, in some embodiments, the terminal may further send a capability report message to the network device, for example, a user equipment capability (user equipment capability, UE capability), where the capability report message may carry second information (for example, a maxUplinkDutyCycle-PC2-FR1 IE). The second information may indicate a maximum proportion of uplink time that can be scheduled by the terminal in the SAR evaluation periodicity (for example, 6 minutes). When scheduling uplink time resources for the terminal, the network device needs to consider the maximum proportion reported by the terminal. A larger maximum proportion indicates a larger proportion of uplink time resources scheduled by the network device for the terminal, that is, a larger proportion of uplink time resources configured by the UL grant to the uplink time resources indicated by the first uplink-downlink configuration.

With reference to the first aspect or the second aspect, in some embodiments, the maximum proportion reported by the terminal may be greater than a first value (for example, 90%). For example, the maximum proportion may be set to 100%. In this way, a proportion of the uplink time resources configured by the network device for the terminal by using the UL grant to the uplink time resources indicated by the first uplink-downlink configuration can exceed a second value (for example, may be 100%). That is, if the maximum proportion reported by the terminal is very large, for example, 100%, the proportion of the uplink time resources configured by using the UL grant delivered by the network device to the uplink time resources indicated by the first uplink-downlink configuration may be very large, for example, 100%. This helps configure more uplink time resources for the terminal, and helps the terminal to transmit more uplink data.

In a possible case, if the terminal in RRC idle mode does not receive the first information from the network device, the terminal may determine the actual power decrease based on a limit uplink time proportion, for example, 20%, to determine the actual transmit power for the uplink transmission.

According to a third aspect, this application provides a terminal, including a plurality of functional units, configured to correspondingly perform the method provided in any one of the possible implementations of the first aspect.

According to a fourth aspect, this application provides a network device, including a plurality of functional units, configured to correspondingly perform the method provided in any one of the possible implementations of the second aspect.

According to a fifth aspect, this application provides a terminal, configured to perform the transmit power control method described in any one of the possible implementations of the first aspect. The terminal may include a memory, and a processor and a transceiver that are coupled to the memory. The transceiver is configured to communicate with another communications device (for example, a network device). The memory is configured to store code for implementing the transmit power control method described in any one of the possible implementations in the first aspect. The processor is configured to execute program code stored in the memory, that is, perform the method provided in any one of the possible implementations in the first aspect.

According to a sixth aspect, this application provides an access network device, configured to perform the transmit power control method described in any one of the possible implementations of the second aspect. The network device may include a memory, and a processor and a transceiver that are coupled to the memory. The transceiver is configured to communicate with another communications device (for example, a terminal). The memory is configured to store code for implementing the transmit power control method described in any one of the possible implementations in the second aspect. The processor is configured to execute program code stored in the memory, that is, perform the method provided in any one of the possible implementations in the second aspect.

According to a seventh aspect, this application provides a communications system. The communications system includes a terminal and a network device, the terminal may be the terminal described in the third aspect or the fifth aspect, and the network device may be the network device described in the fourth aspect or the sixth aspect.

According to an eighth aspect, this application provides a computer-readable storage medium. The computer-readable storage medium stores instructions, and when the instructions are run on a computer, the computer is enabled to perform the transmit power control method described in the first aspect.

According to a ninth aspect, this application provides another computer-readable storage medium. The computer-readable storage medium stores instructions, and when the instructions are run on a computer, the computer is enabled to perform the transmit power control method described in the second aspect.

According to a tenth aspect, this application provides a computer program product including instructions. When the instructions are run on a computer, the computer is enabled to perform the transmit power control method described in the first aspect.

According to an eleventh aspect, this application provides another computer program product including instructions. When the instructions are run on a computer, the computer is enabled to perform the transmit power control method described in the second aspect.

BRIEF DESCRIPTION OF DRAWINGS

To describe technical solutions in embodiments of this application or in the background more clearly, the following describes accompanying drawings used for describing the embodiments of this application or the background.

FIG. 3 is a schematic diagram of seven uplink-downlink configurations of an LTE radio frame;

DESCRIPTION OF EMBODIMENTS

Terms used in DESCRIPTION OF EMBODIMENTS of this application are only used to explain specific embodiments of this application, but are not intended to limit this application.

Figure 1:
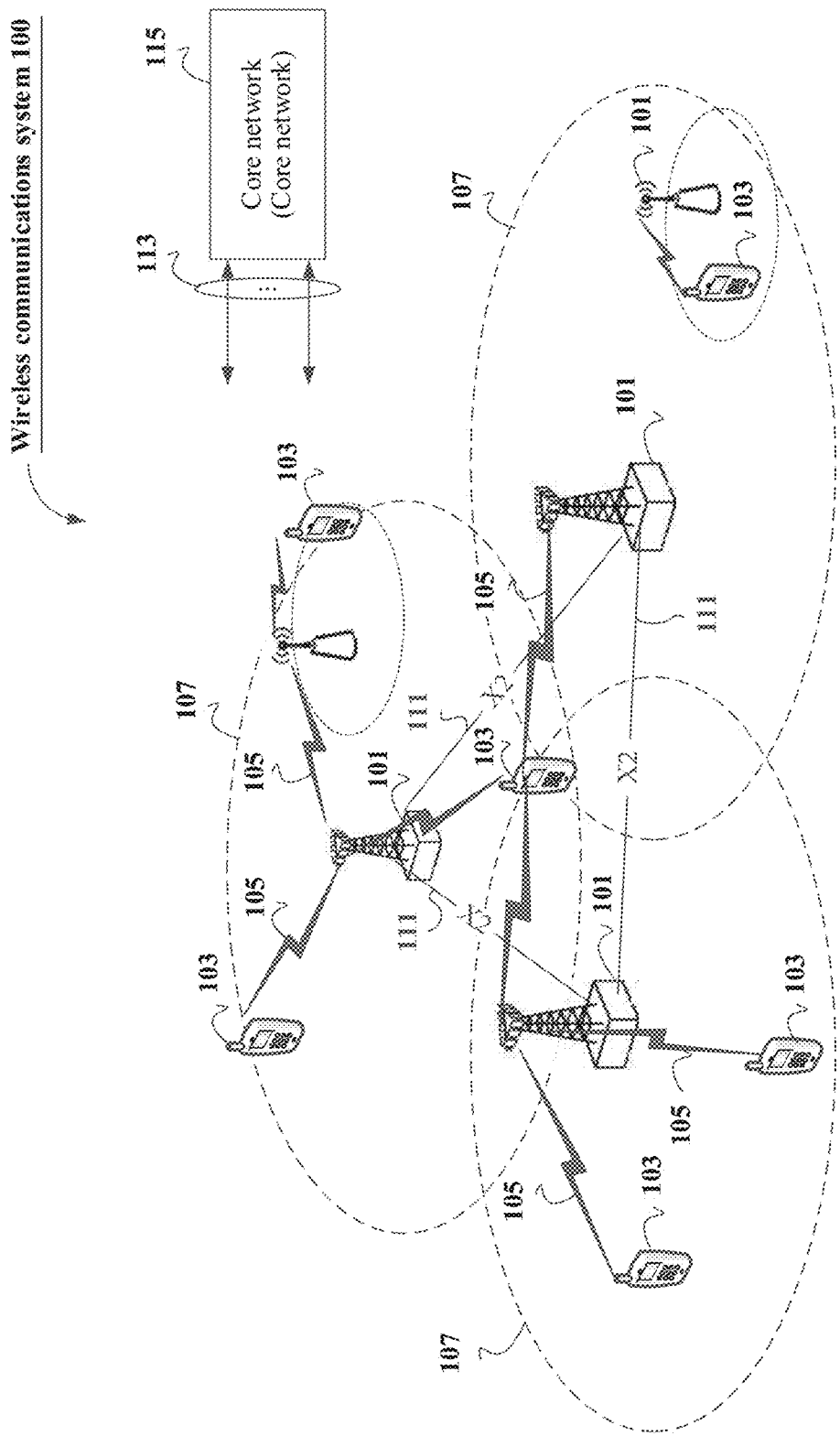
FIG. 1 is a schematic diagram of an architecture of a wireless communications system according to this application.

FIG. 1 shows a wireless communications system 100 according to this application. The wireless communications system 100 may work in a high frequency band, and may be a fifth generation mobile communications (the 5th Generation, 5G) system, a New Radio (New Radio, NR) system, or may be a Long Term Evolution (Long Term Evolution, LTE) system, a machine to machine (Machine to Machine, M2M) system, a future evolved sixth generation mobile communications system, and the like. As shown in FIG. 1, the wireless communications system 100 may include one or more network devices 101, one or more terminals 103, and a core network 115.

The network device 101 may be a base station. The base station may be configured to communicate with one or more terminals, or may be configured to communicate with one or more base stations that have some terminal functions (for example, communication between a macro base station and a micro base station such as an access point). The base station may be a base transceiver station (Base Transceiver Station, BTS) in a time division synchronous code division multiple access (Time Division Synchronous Code Division Multiple Access, TD-SCDMA) system, or an evolved NodeB (Evolved NodeB, eNB) in the LTE system, or a base station in the 5G system or the New Radio (NR) system. In addition, the base station may alternatively be an access point (Access Point, AP), a transmission reception point (TRP), a central unit (Central Unit, CU), or another network entity, and may include some or all of functions of the foregoing network entities.

The terminal 103 may be distributed in the entire wireless communications system 100, and may be stationary or mobile. In some embodiments of this application, the terminal 103 may be user equipment (UE), a mobile device, a mobile station (mobile station), a mobile unit (mobile unit), an M2M terminal, a wireless unit, a remote unit, a user agent, a mobile client, or the like.

Specifically, the network device 101 may be configured to communicate with the terminal 103 through a wireless interface 105 under control of a network device controller (not shown). In some embodiments, the network device controller may be a part of the core network 115, or may be integrated in the network device 101. Specifically, the network device 101 may be configured to transmit control information or user data to the core network 115 through a backhaul (backhaul) interface 113 (for example, an S1 interface). Specifically, the network devices 101 may also directly or indirectly communicate with each other through a backhaul (backhaul) interface 111 (for example, an X2 interface).

It should be noted that the wireless communications system 100 shown in FIG. 1 is only intended to describe the technical solutions of this application more clearly, but is not intended to limit this application. A person of ordinary skill in the art may know that as a network architecture evolves and a new service scenario emerges, the technical solutions provided in this application are also applicable to a similar technical problem.

In the wireless communications system 100, when the terminal 103 transmits data to the network device 101, electromagnetic radiation generated by the terminal 103 causes impact to human tissue near the terminal 103. For this impact, some regulatory institutes have set SAR limits.

Figure 2:
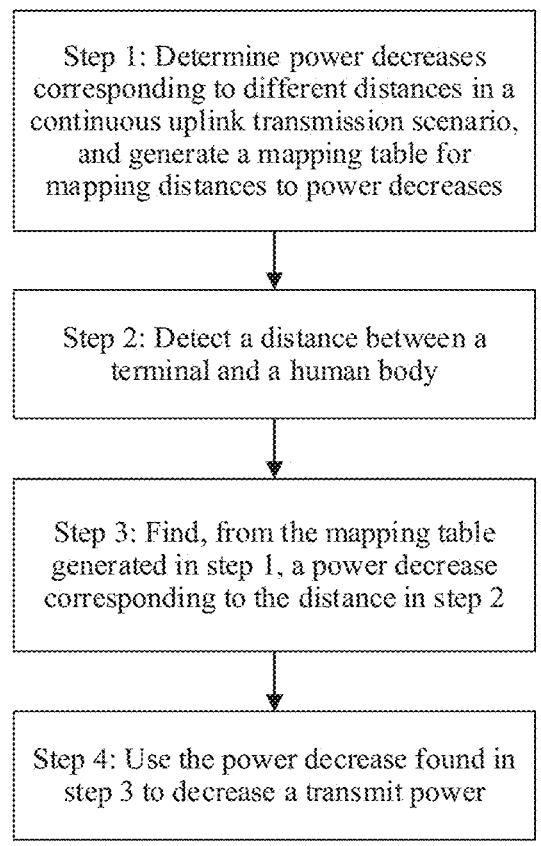
FIG. 2 is a flowchart of a power decrease method in the conventional technology.

In the conventional technology, the SAR limit is complied with by decreasing a transmit power of a terminal. An existing specific process of decreasing a transmit power may be shown in FIG. 2.

Step 1: In a continuous uplink transmission scenario, in a 6-minute SAR evaluation periodicity, test maximum transmit powers that meet a SAR specification and that correspond to different distances. When the terminal 103 is at a distance (for example, 1 millimeter) from a human body, the terminal performs continuous uplink transmission by using a maximum transmit power that meets the SAR specification and that is obtained by testing at this distance, and electromagnetic energy absorbed by the human body within 6 minutes just meets the SAR specification, for example, is close to or equal to 1.6 W/Kg specified by the FCC. Herein, that the electromagnetic energy is close to 1.6 W/Kg means that a difference between the electromagnetic energy absorbed by the human body within 6 minutes and 1.6 W/Kg is less than a specific value, for example, 0.1 W/Kg.

Then, power decreases of the maximum transmit powers that meet the SAR specification and that are obtained by testing at different distances relative to a maximum transmit power of the terminal are determined, and a mapping table is obtained. The mapping table records the power decreases corresponding to the different distances.

Step 2: The terminal 103 detects the distance between the terminal 103 and the human body. For example, the terminal 103 may detect the distance by using a distance sensor.

Step 3: Find, from the mapping table obtained in step 1, a power decrease corresponding to the distance measured in step 2.

Step 4: Decrease a transmit power based on the maximum transmit power of the terminal by using the power decrease found in step 3.

Both LTE and NR support a plurality of uplink-downlink configurations. Uplink-downlink configurations may be adjusted based on different service types to flexibly adapt to different service scenarios and meet asymmetric uplink and downlink service requirements. In an extreme service scenario (for example, a terminal is used as a broadcast hotspot or a transmission hotspot), all subframes (or slots or symbols) in a configuration periodicity (for example, ¼ radio frames) may be assigned to uplink transmission. This extreme uplink-downlink configuration may be referred to as an all-uplink (AllUplink) configuration. The all-uplink configuration means that the entire configuration periodicity is uplink time. That is, a proportion of uplink time to the configuration periodicity is 100%. In this way, continuous uplink transmission can be supported, to adapt to a service scenario of continuous data upload. In subsequent content, a proportion of uplink time to the configuration periodicity may be referred to as an uplink time proportion.

In the conventional technology, to ensure that the SAR limit can be complied with in various service scenarios, a power decrease is determined in the foregoing extreme uplink-downlink configuration, and the power decrease is relatively large. This can ensure that the SAR limit can be complied with in all service scenarios by using the power decrease determined in the conventional technology. In the SAR evaluation periodicity (for example, 6 minutes), compared with discontinuous uplink transmission, continuous uplink transmission generates more electromagnetic radiation and therefore requires a larger power decrease.

However, for many service scenarios, for example, a service scenario in which the terminal 103 in radio resource control (radio resource control, RRC) idle mode performs random access, a proportion of uplink time configured in an uplink-downlink configuration to a configuration periodicity may be only about 20%. Therefore, a power decrease determined in an all-uplink (AllUplink) configuration causes an uplink transmit power to be excessively reduced, and this is not conducive to exerting transmission performance of the terminal.

To resolve an existing technical problem, this application provides a transmit power control method.

A main inventive principle of this application may include: The terminal may obtain an uplink-downlink configuration (UL/DL assignment) from the network side. If an uplink time proportion configured in the uplink-downlink configuration is not 100%, that is, if the uplink-downlink configuration is not an all-uplink (AllUplink) configuration, the terminal may determine a power decrease that can be reduced in the uplink-downlink configuration compared with that in the all-uplink configuration. A power decrease in the all-uplink configuration may be determined with reference to the existing method shown in FIG. 2. Finally, the terminal may decrease an uplink transmit power by using the reduced power decrease. In this way, compared with the conventional technology, in the power control method provided in this application, a transmit power can be increased, so that the terminal can obtain more power headroom during uplink transmission. In this way, transmission performance is improved, and a SAR specification is also met.

First, the uplink-downlink configuration (UL/DL assignment) described in this application is described.

To adapt to different service requirements, the network device may adjust an uplink-downlink configuration, and change uplink and downlink time resource proportions. The uplink-downlink configuration is assignment of uplink time resources and downlink time resources within a period of time. The uplink-downlink configuration may be periodically configured. In a radio frame, uplink data and downlink data may be transmitted at different time (for example, different subframes, slots, or symbols). That is, in a radio frame, some time is used to send information by the network device (such as an eNB) and to receive information by the terminal, and some other time is used to send information by the terminal and to receive information by the network device.

(1) In an LTE communications system, the uplink-downlink configuration may be in a unit of a subframe or a slot. FIG. 3 shows an example of seven uplink-downlink configurations (uplink-downlink configurations) of a radio frame in LTE. In the LTE, a length of a radio frame is 10 milliseconds, and is divided into 10 subframes, and a length of each subframe is 1 millisecond. A subframe 0 and a subframe 5 are downlink (D) subframes, a subframe 1 is a special (S) subframe, and an uplink (U) subframe is transmitted after the special subframe.

As shown in FIG. 3, when an uplink-downlink configuration 0, 2, or 6 is used, a configuration periodicity of the uplink-downlink configuration is 5 ms. When an uplink-downlink configuration 3, 4, or 5 is used, a configuration periodicity of the uplink-downlink configuration is 10 ms. The uplink-downlink configuration may be indicated in a unit of a subframe. For example, the uplink-downlink configuration 0 is that the first subframe is a DL subframe, the third subframe to the fifth subframe are UL subframes, and the second subframe is a special subframe. The uplink-downlink configuration may be adjusted, and may be adjusted by changing lengths of parts in the special subframe.

The special subframe includes three parts: a DwPTS (downlink pilot time slot), a GP (guard period), and an UpPTS (uplink pilot time slot). The DwPTS is used to transmit a downlink reference signal, or may be used to transmit some control information. The UpPTS may be used to transmit some information about a short random access channel (random access channel, RACH) and a sounding reference signal (sounding reference signal, SRS). The GP is a guard period between uplink and downlink. Nine special subframe configurations are specified in the LTE. In different special subframe configurations, lengths of each part in the special subframe may be different. Specifically, the network device may configure, by using a higher layer message (for example, an RRC message), a special subframe configuration to be used for the special subframe.

Figure 4:
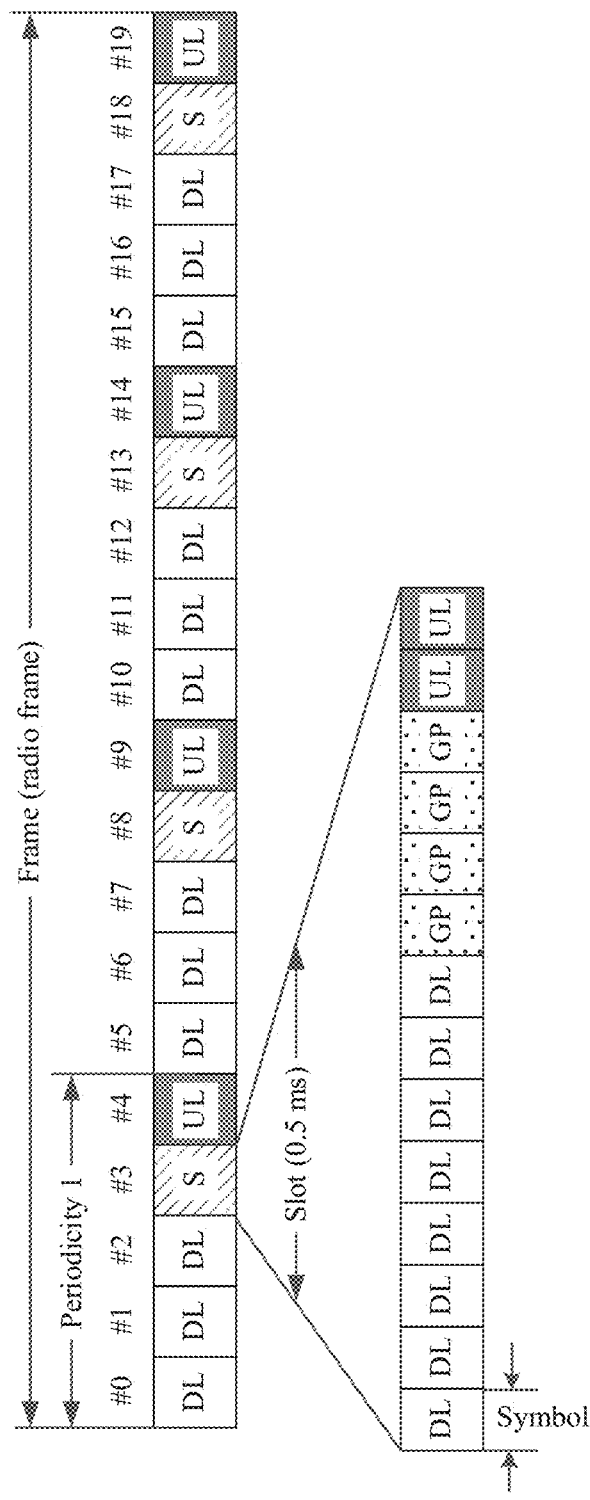
FIG. 4 is a schematic diagram of a structure of an NR radio frame.

(2) In an NR communications system, the uplink-downlink configuration may be in a unit of a slot or a symbol, and may also be referred to as a slot format configuration. FIG. 4 shows an example of a structure of a radio frame in NR. As shown in FIG. 4, a configuration periodicity of the uplink-downlink configuration is 2.5 ms, and a subcarrier spacing is 30 KHz. In a configuration periodicity, there are three downlink (DL) slots, one uplink (UL) slot, and one special (S) slot. In the special slot, there are eight downlink (DL) symbols and two uplink (UL) symbols, and a symbol between an uplink symbol and a downlink symbol is referred to as a flexible (flexible) symbol. The flexible symbol may be used as a guard period (GP) for uplink-downlink switching, or may be configured as a DL symbol or a UL symbol in another manner.

An uplink-downlink configuration represented by the example of the frame structure shown in FIG. 4 is as follows: A slot #0 to a slot #2 are DL slots, a slot #4 is a UL slot, and a slot #3 is a special slot. The uplink-downlink configuration may be adjusted, and may be adjusted by changing a transmission direction of a flexible symbol in a special subframe.

An uplink-downlink configuration is not limited to the uplink-downlink configuration shown in FIG. 4. An NR uplink-downlink configuration may be very flexible, for example, an all-uplink (AllUplink) configuration. The all-uplink configuration means that an entire configuration periodicity is uplink time. That is, a proportion of uplink time to the configuration periodicity is 100%. In this way, continuous uplink transmission can be supported, to adapt to a service scenario of continuous data upload. In subsequent content, a proportion of uplink time to the configuration periodicity may be referred to as an uplink time proportion.

In addition, several configuration modes of uplink-downlink configurations in this application are described.

(1) Cell-Specific Semi-Persistent UL/DL Configuration:

A network device may deliver an uplink-downlink configuration by using a system message such as a system information block (system information block, SIB). In a cell search process, a terminal may receive the system message sent by the network device.

In an LTE communications system, the uplink-downlink configuration may be indicated by a TDD-Config IE in a SIB 1. In the TDD-Config IE, a subframeAssignment information element may indicate which of the seven uplink-downlink configurations shown in FIG. 3 is used for a configuration periodicity, and a specialSubframePattern information element may indicate which special subframe configuration is used for a special subframe. Based on the two information elements, the terminal may determine the uplink-downlink configuration delivered by the network device.

In an NR communications system, the uplink-downlink configuration may be indicated by the following two information elements (information element, IE) in a SIB 1: UL-DL-configuration-common and UL-DL-configuration-common-Set2. Specifically, in the two IEs, a nrofDownlinkSlots information element may indicate a quantity of DL slots in one configuration periodicity, a nrofDownlinkSymbols information element may indicate a quantity of DL symbols in a special slot, a nrofUplinkSlots information element may indicate a quantity of UL slots in one configuration periodicity, and a nrofUplinkSymbols information element may indicate a quantity of UL symbols in a special slot. Based on these information elements, the terminal may determine the uplink-downlink configuration delivered by the network device.

(2) User-Specific Semi-Persistent UL/DL Configuration:

The user-specific semi-persistent UL/DL configuration may be used to change a transmission direction of a flexible symbol in the cell-specific semi-persistent UL/DL configuration. The user-specific semi-persistent UL/DL configuration may be implemented by a ServingCellConfig IE in an RRC message. In the ServingCellConfig IE, a tdd-UL-DL-ConfigurationDedicated information element may specifically indicate which slot and symbol need to be changed in the transmission direction.

(3) Dynamic UL/DL Configuration Mode:

The dynamic UL/DL configuration may be used to change a transmission direction of a flexible symbol in the cell-specific semi-persistent UL/DL configuration or the user-specific semi-persistent UL/DL configuration. The dynamic UL/DL configuration may be implemented by a DCI message. Specifically, a network device may dynamically configure a slot format by using a DCI format 2_0 to configure and change the transmission direction of the flexible symbol.

The user-specific semi-persistent UL/DL configuration mode and the dynamic UL/DL configuration mode may be applied to an NR communications system in an LTE frame structure, there is no flexible symbol, and an uplink-downlink configuration is implemented by using the cell-specific semi-persistent UL/DL configuration.

The foregoing several configuration modes are applicable to a time division duplex (time division duplex, TDD) communications system. In a frequency division duplex (frequency division duplex, FDD) communications system, assignment of uplink time resources and downlink time resources may be indicated by configuring a time division multiplexing (time division multiplexing, TDM) pattern (pattern). First information may be a tdm-patternConfig IE carried in an RRC connection reconfiguration message. There are two scenarios for configuring TDM in the FDD communications system: 1, a non-standalone (non-standalone) networking scenario, and 2, a carrier aggregation (carrier aggregation, CA) scenario. Mutual interference exists in both scenarios. In the scenario 1, LTE second harmonic causes interference to an NR frequency band. In the scenario 2, a high order harmonic of a carrier causes interference to another carrier. In addition, during non-independent networking, in a scenario in which a base station performs remote power control, a terminal performs uplink transmission to an NR base station and an LTE base station in a time-sharing mode. In a single mode, all transmit powers can be used, and a TDM-Pattern is configured to improve coverage. The single mode is an uplink mode in which the terminal performs uplink transmission only to a single base station (the NR base station or the LTE base station).

Applications of the foregoing several configuration modes are described in detail in subsequent embodiments, and details are not described herein again.

The following describes an overall procedure of the transmit power control method provided in this application based on the foregoing main invention principle.

Figure 5:
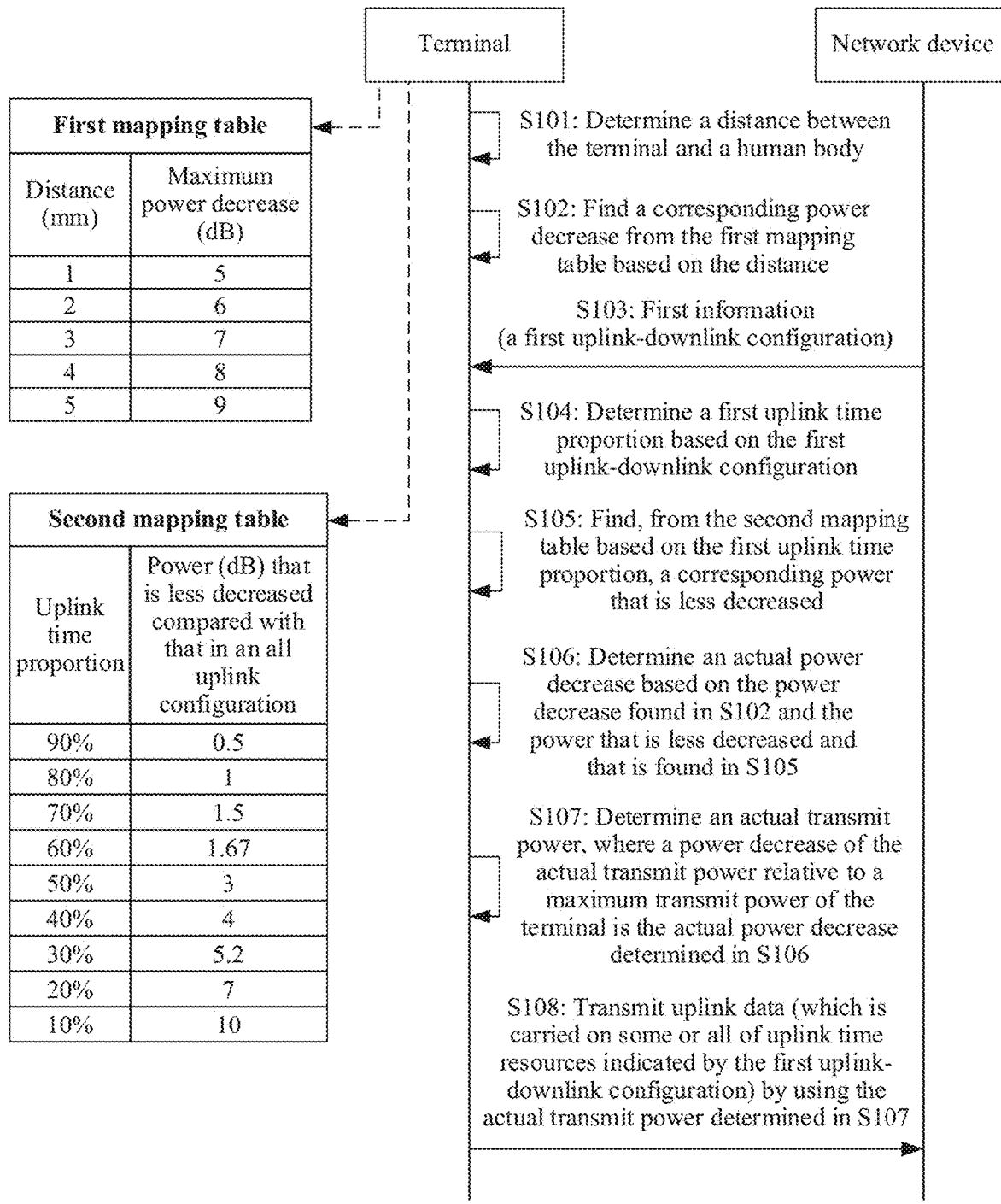
FIG. 5 is a schematic flowchart of a transmit power control method according to this application.

As shown in FIG. 5, in the transmit power control method provided in this application, the terminal may access and query a first mapping table and a second mapping table. The first mapping table may include a plurality of candidate distances and power decreases (deltas 1 for short) corresponding to the plurality of candidate distances. The first mapping table may be obtained according to step 1 in the conventional technology shown in FIG. 2. The second mapping table may include a plurality of candidate uplink time proportions and power increases (deltas 2 for short) corresponding to the plurality of candidate uplink time proportions. A power increase corresponding to an uplink time proportion indicates a power by which a power for the uplink time proportion is less decreased compared with a power for an all-uplink configuration. Within a SAR evaluation periodicity (for example, 6 minutes), compared with continuous uplink transmission (an all-uplink configuration, and an uplink time proportion 100%), discontinuous uplink transmission (an uplink time proportion less than 100%) generates less electromagnetic radiation and requires a smaller power decrease. The delta 2 in the second mapping table may be an empirical value. For example, a transmit power for an uplink proportion 50% may be 3 dB less decreased compared with a transmit power for an uplink proportion 100%. The delta 2 may alternatively be obtained through actual tests.

Content in the first mapping table and the second mapping table shown in FIG. 5 are merely examples, and should not constitute a limitation. The first mapping table and the second mapping table may be stored in the terminal, or may be stored in a cloud server/storage device that can be accessed by the terminal. This is not limited herein.

As shown in FIG. 5, the transmit power method provided in this application may include the following steps.

S101: The terminal determines a distance between the terminal and a human body.

Specifically, the terminal may detect the distance between the terminal and the human body by using a distance sensor, or may detect the distance between the terminal and the human body by using a radar ranging sensor, an infrared ranging sensor, or the like. Optionally, the terminal may further determine the distance between the terminal and the human body based on a use case (use case). For example, when it is determined that a user is making a call, and an earpiece of the terminal is turned on, the terminal may determine that the distance between the user and the terminal is within a specific distance range, for example, 0.1 mm to 1.0 mm. The use case is not limited to this example. The terminal may alternatively determine the distance between the user and the terminal based on another use case. This is not limited in this application.

S102: The terminal may find, from the first mapping table, a power decrease corresponding to the distance determined in S101.

For example, if the distance determined in S101 is 1 mm, a power decrease corresponding to 1 mm is 5 dB. This means that when the human body is 1 mm away from the terminal, a transmit power is obtained by decreasing 5 dB from a maximum transmit power of the terminal. In this way, even in an extreme scenario in which the terminal performs continuous uplink transmission, a specific absorption rate specification can be met. That is, a power decrease determined through tests in this extreme scenario is a maximum power decrease because the power decrease can ensure that the specific absorption rate specification is also met in another scenario.

S103: The terminal may receive first information sent by a network device, where the first information may indicate a first uplink-downlink configuration.

The first information may be carried in a system message (for example, a SIB 1), or may be carried in a higher layer message (for example, an RRC message), or may be carried in a PDCCH (for example, a DCI message).

Specifically, when a cell-specific semi-persistent UL/DL configuration is used as the first uplink-downlink configuration, the first information may be carried in the system message. In an LTE communications system, the first information may be a TDD-Config IE in a SIB 1. In an NR communications system, the first information may be a UL-DL-configuration-common IE and/or a UL-DL-configuration-common-Set2 IE in a SIB 1. When a user-specific semi-persistent UL/DL configuration is used as the first uplink-downlink configuration, the first information may be carried in the higher layer message. The first information may be a ServingCellConfig IE in the RRC message. When a dynamic UL/DL configuration is used as the first uplink-downlink configuration, the first information may be carried in the DCI message. The first information may be a ServingCellConfig IE in the RRC message.

The first uplink-downlink configuration may indicate assignment of uplink and downlink time resources within a period of time, for example, indicate which subframes are UL subframes and which subframes are DL subframes in a configuration periodicity. For an uplink-downlink configuration, refer to the foregoing content. Details are not described herein again.

S104: The terminal may determine a first uplink time proportion based on the first uplink-downlink configuration.

The first uplink time proportion is a proportion of uplink time (for example, duration of a UL subframe) indicated by the first uplink-downlink configuration in a configuration periodicity. For example, assuming that the first uplink-downlink configuration is the uplink-downlink configuration 0 shown in FIG. 3, the uplink-downlink configuration 0 is that the first subframe is a DL subframe, the third subframe to the fifth subframe are UL subframes, and the fourth subframe is a special subframe. Therefore, the first uplink time proportion is 3/5, where 3 represents three UL subframes (the third to the fifth subframes), and 5 represents a quantity of subframes in the entire configuration periodicity.

S105: The terminal may find, from the second mapping table based on the first uplink time proportion, a power increase (namely, a power that is less decreased, and a delta 2) corresponding to the first uplink time proportion.

For example, if the first uplink time proportion determined in S104 is 50%, a power increase corresponding to 50% is 3 dB. This indicates that a maximum transmit power that meets the specific absorption rate specification when an uplink time proportion is 50% is specifically 3 dB greater than a maximum transmit power that meets the specific absorption rate specification when an uplink time proportion is 100%. Within a SAR evaluation periodicity (for example, 6 minutes), compared with continuous uplink transmission in which an uplink time proportion is 100%, discontinuous uplink transmission in which an uplink time proportion is 50% generates less electromagnetic radiation and therefore requires a smaller power decrease.

It may be understood that a power increase (namely, a power that is less decreased, and a delta 2) is at most equal to the power decrease found in S102 and does not exceed the power decrease.

S106: The terminal may determine an actual power decrease (which may be referred to as a delta 3) based on the power decrease found in S102 and the power increase (the power that is less decreased) found in S105.

Specifically, the actual power decrease may be equal to the power decrease found in S102 minus the power increase (the power that is less decreased) found in S105. That is, the actual power decrease (the delta 3) may be determined by the power decrease (the delta 1) found in S102 and the power increase (the delta 2) found in S105. If the first uplink time proportion is less than 100%, the actual power decrease is less than the power decrease found in S102. In this way, while the SAR specification is met, a transmit power decrease can be as small as possible, more power headroom can be obtained, transmission performance can be improved.

A relationship between the three decreases is not limited to: actual power decrease (delta 3)=power decrease (delta 1) found in S102—power increase (delta 2) found in S105. The relationship between the three decreases may be summarized as follows: delta 3=f (delta 1, delta 2), where f is a function with the delta 1 and the delta 2 as parameters, the delta 3 and the delta 1 are positively correlated, and the delta 3 and the delta 2 are negatively correlated.

S107: The terminal may determine an actual transmit power based on the actual power decrease (the delta 3) determined in S106. A power decrease of the actual transmit power relative to the maximum transmit power of the terminal is the actual power decrease (the delta 3).

S108: The terminal may perform uplink transmission on some or all of uplink time resources indicated by the first uplink-downlink configuration, where a transmit power for the uplink transmission is the actual transmit power determined in S107.

The uplink time resources indicated by the first uplink-downlink configuration are specific to an entire cell. The terminal may perform the uplink transmission on some or all of the uplink time resources. For a specific terminal, uplink time resources specifically occupied by uplink transmission need to be further indicated by an uplink grant (UL grant) delivered by the network device. Before S108, the terminal may further receive the UL grant sent by the network device, where the UL grant may be carried in a DCI message. The terminal may further determine, based on the UL grant, which part of the uplink time resources indicated by the first uplink-downlink configuration carry uplink data. This is not shown in FIG. 5.

The terminal may further send a capability report message to the network device, for example, a user equipment capability (user equipment capability, UE capability), where the capability report message may carry second information (for example, a maxUplinkDutyCycle-PC2-FR1 IE). This is not shown in FIG. 5. The second information may indicate a maximum proportion of uplink time that can be scheduled by the terminal in the SAR evaluation periodicity (for example, 6 minutes). When scheduling uplink time resources for the terminal, the network device needs to consider the maximum proportion reported by the terminal. A larger maximum proportion indicates a larger proportion of uplink time resources scheduled by the network device for the terminal, that is, a larger proportion of uplink time resources configured by the UL grant to the uplink time resources indicated by the first uplink-downlink configuration.

In this application, the maximum proportion reported by the terminal may be greater than a first value (for example, 90%). For example, the maximum proportion may be set to 100%. In this way, a proportion of the uplink time resources configured by the network device for the terminal by using the UL grant to the uplink time resources indicated by the first uplink-downlink configuration can exceed a second value (for example, may be 100%). That is, if the maximum proportion reported by the terminal is very large, for example, 100%, the proportion of the uplink time resources configured by using the UL grant delivered by the network device to the uplink time resources indicated by the first uplink-downlink configuration may be very large, for example, 100%. This helps configure more uplink time resources for the terminal, and helps the terminal to transmit more uplink data.

In a possible case, if the terminal in RRC idle mode does not receive the first information from the network device, the terminal may determine the actual power decrease based on a limit uplink time proportion, for example, 20%, to determine the actual transmit power for the uplink transmission.

It can be learned that, in the transmit power control method shown in FIG. 5, the terminal may determine an actual power decrease based on an uplink-downlink configuration (the first uplink-downlink configuration) delivered by the network side. In this way, while the SAR specification is met, a transmit power decrease can be as small as possible, more power headroom can be obtained, and transmission performance can be improved.

In this application, an uplink-downlink configuration based on which the first mapping table is generated may be referred to as a second uplink-downlink configuration. An uplink time proportion indicated by the second uplink-downlink configuration may be referred to as a second uplink time proportion. The second uplink-downlink configuration may be an all-uplink configuration, and in this case, the second uplink time proportion is 100%. The second uplink-downlink configuration is not limited to an extreme uplink configuration such as the all-uplink configuration. The second uplink-downlink configuration may alternatively be another uplink-downlink configuration with a large uplink time proportion, for example, an uplink time proportion 95%.

In this application, the power decrease found in S102 may be referred to as a first power decrease, and the power increase (the power that is less decreased) found in S105 may be referred to as a first power increase. The first power decrease is used to decrease, in the second uplink-downlink configuration, an actual transmit power from the maximum transmit power of the terminal to a maximum transmit power that meets the specific absorption rate specification. Specifically, at a specific distance (for example, 1 mm), the first power decrease may be equal to a difference between the maximum transmit power of the terminal and a first measured power. The first measured power is a maximum transmit power that meets the specific absorption rate specification and that is measured during continuous uplink transmission performed when the terminal is away from the human body at the specific distance. The first power increase is equal to a difference between a maximum transmit power that meets the specific absorption rate specification in the first uplink-downlink configuration and a maximum transmit power that meets the specific absorption rate specification in the second uplink-downlink configuration. That is, the first power increase is a power that is less decreased. The first power increase may alternatively be referred to as a power by which the maximum transmit power that meets the specific absorption rate specification in the first uplink-downlink configuration can be increased compared with the maximum transmit power that meets the specific absorption rate specification in the second uplink-downlink configuration.

In this application, when the first uplink time proportion is less than the second uplink time proportion, the actual power decrease is less than the first power decrease. In most service scenarios, an uplink time proportion indicated by an uplink-downlink configuration is always less than the second uplink time proportion (for example, 100%). The reduction in the actual power decrease may cause more power headroom. In this way, transmission performance is improved while the SAR specification is met.

In addition to the SAR specification, the specific absorption rate specification considered in the transmit power control method provided in this application may be further a maximum permissible exposure (maximum permissible exposure, MPE) specification for millimeter wave (mm-Wave) communication.

Figure 6A:
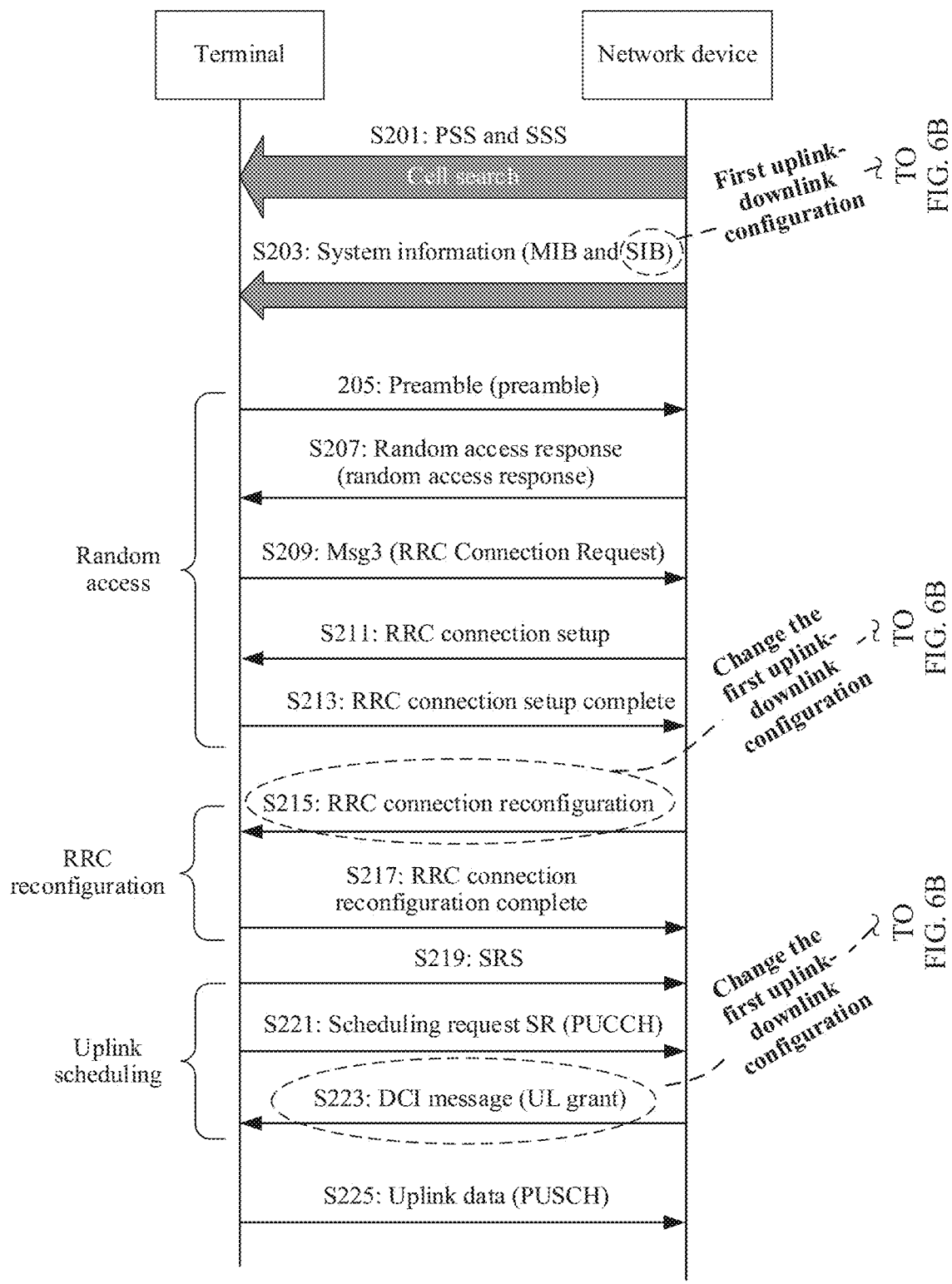
FIG. 6A and FIG. 6B are a message schematic flowchart of a transmit power control method according to this application.
Figure 6B:
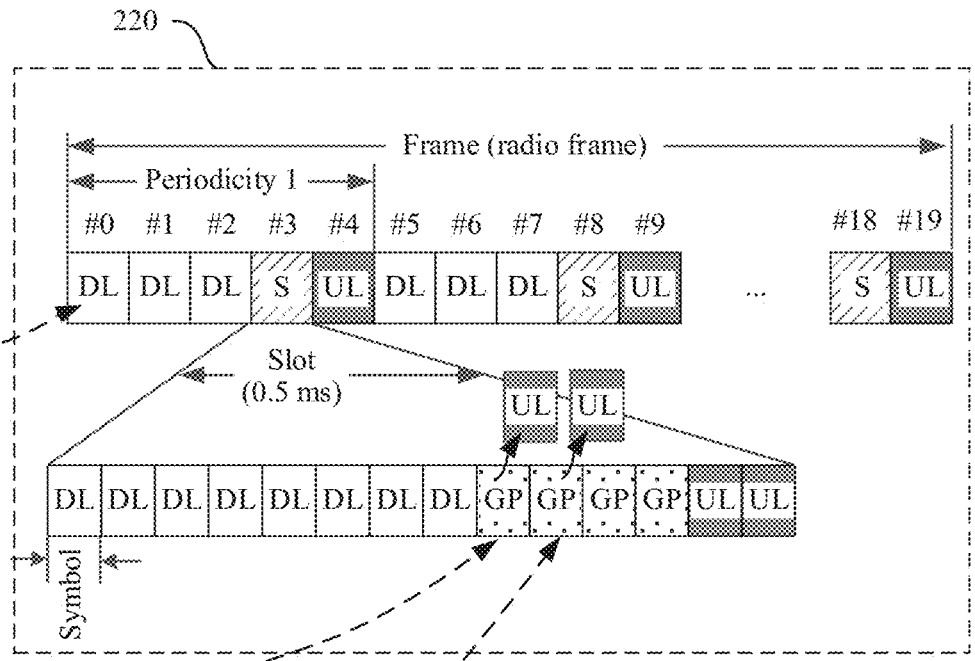

FIG. 6A and FIG. 6B show a main message procedure after a terminal is powered on. The following describes, with reference to the procedure, an application of a transmit power control method provided in this application. Details are as follows:

Phase 1: Perform search in a cell (S201).

When the terminal is powered on, the terminal needs to perform search in a cell and achieve synchronization. In a cell search procedure, the terminal receives downlink synchronization signals: a primary synchronization signal (primary synchronization signal, PSS) and a secondary synchronization signal (secondary synchronization signal, SSS) that are sent by a network device.

Phase 2: Obtain system information (system information) of the cell (S202).

After the cell search procedure, the terminal needs to obtain the system information of the cell, to know how the cell is configured, so as to access the cell and correctly operate in the cell. The system information is cell-specific information, that is, takes effect on all UEs that access the cell. The system information may be classified into a master information block (master information block, MIB) and a plurality of system information blocks (system information blocks, SIBs).

The network device may use the system information such as a SIB 1 to carry indication information, namely, first information, of a first uplink-downlink configuration. A mode in which the first uplink-downlink configuration is delivered by using the system information (for example, the SIB 1) is the foregoing cell-specific semi-persistent UL/DL configuration mode. For details about how to deliver the first uplink-downlink configuration by using the SIB 1, refer to description of the foregoing cell-specific semi-persistent UL/DL configuration. Details are not described herein again.

In this way, during subsequent uplink transmission, the terminal may determine the first uplink-downlink configuration based on the first information carried in the SIB 1, and finally determine an actual transmit power. For how to determine the actual transmit power, refer to the method in FIG. 5. Details are not described herein again. Subsequent uplink transmission may occur in the following scenarios: a scenario 1 in which the terminal in RRC idle mode performs random access, and a scenario 2 in which the terminal in RRC connected mode transmits uplink data.

Phase 3: Random access (S205 to S213).

After the cell search procedure, the terminal already achieves downlink synchronization with the cell. Therefore, the terminal can receive downlink data. However, the terminal can perform uplink transmission only after achieving uplink synchronization with the cell. The terminal sets up a connection to the cell and achieves uplink synchronization through a random access procedure.

The random access procedure may include the following steps:

S205: The terminal sends a random access preamble (preamble) to the network device, to initiate a random access request.

S207: After detecting the preamble, the network device returns a random access response (random access response) to the terminal.

S209: After receiving the random access response, the terminal sends an Msg3 to the network device.

The Msg3 includes different content in different scenarios. In an initial access scenario, the Msg3 may carry an RRC connection request (RRC Connection Request). In an RRC connection reestablishment scenario, the Msg3 may carry an RRC connection reestablishment request (RRC Connection Reestablishment Request). In a cell handover scenario, the Msg3 may carry an RRC handover complete message. FIG. 6A and FIG. 6B show the initial access scenario. The Msg3 carries the RRC connection request.

S211: After receiving the RRC connection request, the network device returns an RRC connection setup (RRC Connection Setup) message.

S213: After receiving the RRC connection setup message, the terminal sends an RRC connection setup complete message to the network device. At this point, an RRC connection is set up, and the terminal enters the RRC connected mode from the RRC idle mode.

In the random access procedure, S205 and S209 describe uplink transmission, and an actual transmit power may be determined according to the power transmission control method provided in this application. For details, refer to the method embodiment in FIG. 5. Details are not described herein again. The indication information (namely, the first information) of the first uplink-downlink configuration based on which the actual transmit power is determined may be carried in the system information (for example, the SIB 1).

Phase 4: RRC connection reconfiguration.

A purpose of the RRC connection reconfiguration is to modify an RRC connection, for example, set up, modify, or release a radio bearer, and set up, modify, or release a measurement.

The RRC connection reconfiguration may include the following steps:

S215: The network device sends an RRC connection reconfiguration (RRC Connection Reconfiguration) message to the terminal.

S217: After receiving the RRC connection reconfiguration message, the terminal sends an RRC connection reconfiguration complete message to the network device, to acknowledge that the reconfiguration is completed.

The network device may use the RRC connection reconfiguration message to carry the indication information, namely, the first information, of the first uplink-downlink configuration. A mode of delivering the first uplink-downlink configuration by using the RRC connection reconfiguration message may be the foregoing user-specific semi-persistent UL/DL configuration mode. That is, the first information carried in the RRC connection reconfiguration message may be used to change the first uplink-downlink configuration delivered in the SIB 1. In addition to the RRC connection reconfiguration message, another RRC message delivered by the network device may be further used to deliver the first uplink-downlink configuration. For details about how to deliver the first uplink-downlink configuration by using an RRC message, refer to description of the foregoing user-specific semi-persistent UL/DL configuration. Details are not described herein again.

In this way, during subsequent uplink transmission, based on the first uplink-downlink configuration delivered by using the SIB 1, the terminal may further determine a changed first uplink-downlink configuration based on the first information carried in the RRC connection reconfiguration message. An actual transmit power for subsequent uplink transmission is determined based on the changed first uplink-downlink configuration. The subsequent uplink transmission may occur in a scenario in which the terminal in RRC connected mode transmits uplink data.

Phase 5: Uplink scheduling (S219 to S223).

S219: The terminal sends an SRS. Similar to downlink, the network device needs to perform uplink channel estimation when performing uplink scheduling. This is obtained by measuring the SRS sent by the terminal.

S221: When uplink data needs to be transmitted, the terminal sends a scheduling request (scheduling request, SR) to the network device, notifies the network device that data needs to be transmitted, and requests the network device to assign uplink resources. The uplink resources include uplink time resources and uplink frequency resources.

S223: The network device delivers a UL grant to the terminal, where the UL grant may be carried in a DCI message. The UL grant may indicate the uplink resources assigned by the network device to the terminal. Specifically, a proportion of the uplink time resources assigned to the terminal indicated by the UL grant to time resources indicated by the first uplink-downlink configuration is less than or equal to 100%.

The network device may use the DCI message to carry the indication information, namely, the first information, of the first uplink-downlink configuration. A mode of delivering the first uplink-downlink configuration by using the DCI message may be the foregoing dynamic UL/DL configuration mode. That is, the first information carried in the DCI message may be used to change the first uplink-downlink configuration delivered in the SIB 1, or change the changed first uplink-downlink configuration in the RRC message. In addition to the DC message, another physical downlink control channel (physical downlink control channel, PDCCH) message delivered by the network device may be further used to deliver the first uplink-downlink configuration. For details about how to deliver the first uplink-downlink configuration by using the DCI message, refer to description of the foregoing dynamic UL/DL configuration. Details are not described herein again.

In this way, during subsequent uplink transmission, based on the first uplink-downlink configuration delivered by using the SIB 1 or the first uplink-downlink configuration changed by using the RRC message, the terminal may further determine a changed first uplink-downlink configuration based on the first information carried in the DCI message. An actual transmit power for subsequent uplink transmission is determined based on the further changed first uplink-downlink configuration. The subsequent uplink transmission may occur in a scenario in which the terminal in RRC connected mode transmits uplink data.

Phase 6: Uplink data transmission (S225).

S225: After obtaining the UL grant, the terminal transmits the uplink data on the uplink resources assigned by the network device to the terminal.

In an uplink data transmission procedure, an actual transmit power may be determined according to the power transmission control method provided in this application. For details, refer to the method embodiment in FIG. 5. Details are not described herein again.

The first uplink-downlink configuration based on which the actual transmit power is determined may be determined in the following several manners:

Manner 1: Determine the first uplink-downlink configuration based on the first information carried in the system information (for example, the SIB 1).

Manner 2: Change, based on the first information carried in the RRC message (for example, RRC Connection Reconfiguration), the first uplink-downlink configuration delivered in the system information (for example, the SIB 1).

Manner 3: Based on the first information carried in the DCI message, change the first uplink-downlink configuration delivered by using the system information (for example, the SIB 1), or further change the first uplink-downlink configuration changed by using the RRC message.

In other words, the first uplink-downlink configuration may be configured in a progressive manner by using the cell-specific semi-persistent UL/DL configuration, the user-specific semi-persistent UL/DL configuration, and the dynamic UL/DL configuration.

In addition, in an FDD communications system, a TDM pattern may be used to indicate assignment of uplink time resources and downlink time resources. The first information is a tdm-patternConfig IE carried in an RRC connection reconfiguration message.

For example, as shown in FIG. 6A and FIG. 6B, it is assumed that the first uplink-downlink configuration indicated by the first information carried in the SIB 1 is an uplink-downlink configuration 220 shown in FIG. 6A and FIG. 6B. Specifically, a slot #0 to a slot #2 are DL slots, a slot #4 is a UL slot, and a slot #3 is a special slot. The uplink-downlink configuration may be adjusted, and may be adjusted by changing a transmission direction of a flexible symbol in a special subframe. In the special slot, there are eight downlink (DL) symbols and two uplink (UL) symbols, and a symbol between an uplink symbol and a downlink symbol is referred to as a flexible (flexible) symbol. The flexible symbol may be used as a guard period (GP) for uplink-downlink switching, or may be configured as a DL symbol or a UL symbol in another manner (for example, the user-specific semi-persistent UL/DL configuration and the dynamic UL/DL configuration).

Further, the first information carried in the RRC connection reconfiguration message transmitted in S215 may be used to change a transmission direction of a flexible symbol in the uplink-downlink configuration 220. For example, the first flexible symbol between the DL symbols and the UL symbols is changed to a UL symbol.

Further, based on the first uplink-downlink configuration changed by using the RRC connection reconfiguration message, the first information carried in the DCI message transmitted in S223 may be further used to change a transmission direction of a flexible symbol in the uplink-downlink configuration 220. For example, the second flexible symbol between the DL symbols and the UL symbols is changed to a UL symbol. Optionally, the first information carried in the DCI message may be used to change the first uplink-downlink configuration delivered in the SIB 1, especially when the first uplink-downlink configuration is not changed by using the RRC message.

The transmit power control method provided in this application may be further applied to a non-standalone (non-standalone) networking architecture.

Figure 7:
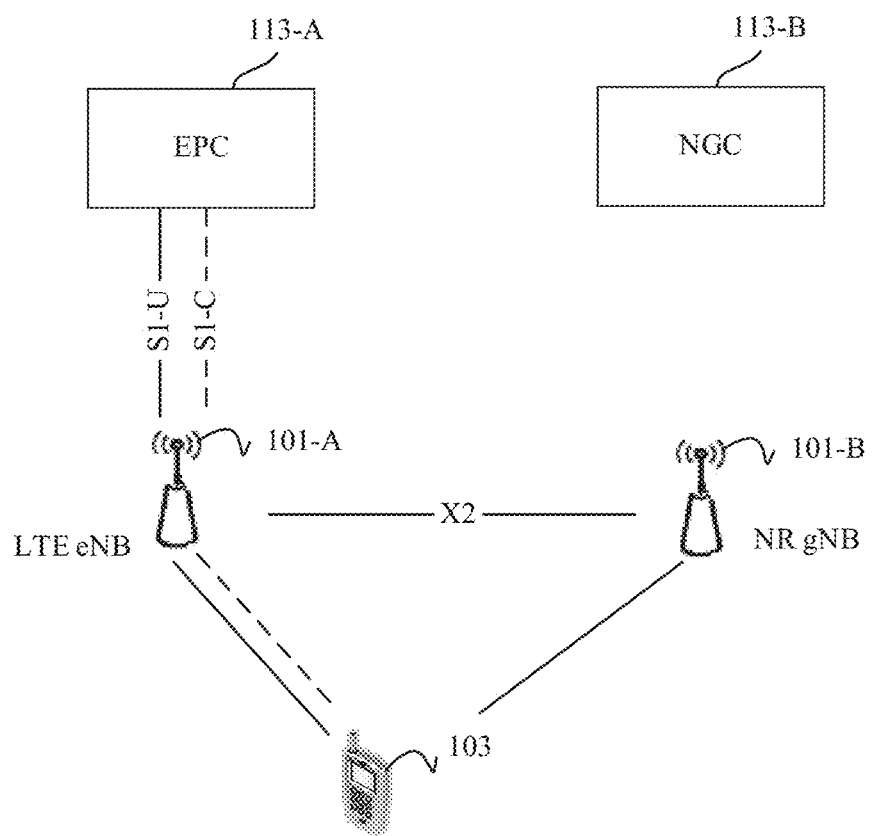
FIG. 7 is a schematic diagram of a non-standalone (non-standalone) networking architecture.

In an example of a non-standalone (non-standalone) networking architecture shown in FIG. 7, a terminal 103 may be connected to two network devices, for example, a network device 101-A (LTE eNB) and a network device 101-B (NR gNB). The network device 101-A (LTE eNB) is connected to an LTE core network (evolved packet core (evolved packet core, EPC)) 113-A, and the network device 101-B (NR gNB) is connected to a next generation core network (Next generation core (NGC)) 113-B. The network device 101-A (LTE eNB) is a primary network device, and the network device 101-B (NR gNB) is a secondary network device.

In the networking architecture shown in FIG. 7, the terminal may receive two sets of first uplink-downlink configurations delivered by the network device 101-A (LTE eNB) and the network device 101-B (NR gNB). The two sets of first uplink-downlink configurations may be referred to as a configuration A and a configuration B for short. The configuration A may be configured in a progressive manner by using the cell-specific semi-persistent UL/DL configuration, the user-specific semi-persistent UL/DL configuration, and the dynamic UL/DL configuration. The configuration B may be configured in a progressive manner by using the user-specific semi-persistent UL/DL configuration and the dynamic UL/DL configuration. The configuration B cannot be delivered by using a SIB 1 message, because the terminal cannot receive a SIB 1 delivered by the secondary network device.

The terminal may determine, based on the configuration A, an actual power decrease for performing uplink transmission to the network device 101-A, to determine an actual transmit power for performing uplink transmission to the network device 101-A. The terminal may determine, based on the configuration B, an actual power decrease for performing uplink transmission to the network device 101-B, to determine an actual transmit power for performing uplink transmission to the network device 101-B. Both the actual transmit powers for the two types of uplink transmission may be determined according to the power transmission control method provided in this application. For details, refer to the method embodiment in FIG. 5. Details are not described herein again.

In this way, in the non-standalone (non-standalone) networking architecture, when performing uplink transmission to different network devices, the terminal may separately determine actual power decreases based on corresponding uplink-downlink configurations. In this way, while the SAR specification is met, more power headroom is obtained, transmission performance is improved.

Figure 8:
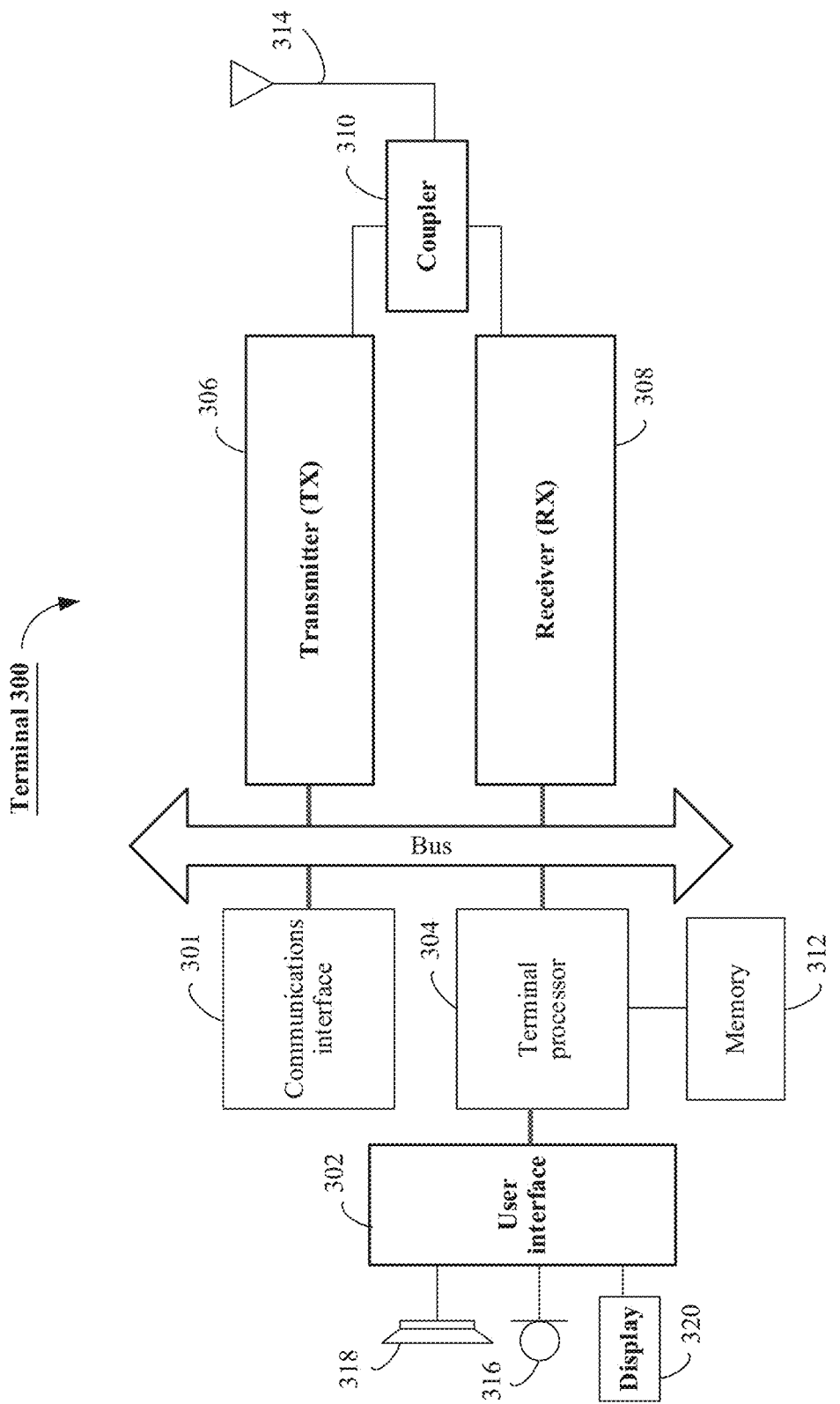
FIG. 8 is a schematic diagram of a hardware architecture of a terminal device according to an embodiment of this application.

FIG. 8 shows a terminal 300 according to some embodiments of this application. As shown in FIG. 8, the terminal 300 may include an input/output module (including an audio input/output module 318, a key input module 316, a display 320, and the like), a user interface 302, one or more terminal processors 304, a transmitter 306, a receiver 308, a coupler 310, an antenna 314, and a memory 312. These components may be connected through a bus or in another manner. In FIG. 8, an example in which the components are connected through a bus is used.

A communications interface 301 may be used by the terminal 300 to communicate with another communications device, for example, a base station. Specifically, the base station may be a network device 400 shown in FIG. 9. The communications interface 301 is an interface between the terminal processor 304 and a transceiver system (including the transmitter 306 and the receiver 308), for example, an X1 interface in LTE. In specific implementation, the communications interface 301 may include one or more of a global system for mobile communications (Global System for Mobile Communications, GSM) (2G) communications interface, a wideband code division multiple access (Wideband Code Division Multiple Access, WCDMA) (3G) communications interface, a Long Term Evolution (Long Term Evolution, LTE) (4G) communications interface, and the like, or may be a communications interface of 4.5G, 5G, or future new radio. In addition to a wireless communications interface, a wired communications interface 301, for example, a local area network (Local Access Network, LAN) interface may be further configured on the terminal 300.

The antenna 314 may be configured to convert electromagnetic energy in a transmission line into an electromagnetic wave in free space, or convert an electromagnetic wave in free space into electromagnetic energy in a transmission line. The coupler 310 is configured to divide a mobile communication signal received by the antenna 314 into a plurality of channels of signals, and allocate the plurality of channels of signals to a plurality of receivers 308.

The transmitter 306 may be configured to transmit a signal output by the terminal processor 304. The receiver 308 may be configured to receive the mobile communication signal received by the antenna 314. In some embodiments of this application, the transmitter 306 and the receiver 308 may be considered as a wireless modem. In the terminal 300, there may be one or more transmitters 306 and receivers 308.

In addition to the transmitter 306 and the receiver 308 shown in FIG. 8, the terminal 300 may further include another communications component, for example, a GPS module, a Bluetooth (Bluetooth) module, or a wireless fidelity (Wireless Fidelity, Wi-Fi) module. In addition to the wireless communication signal, the terminal 300 may further support another wireless communication signal, for example, a satellite signal or a short-wave signal. In addition to wireless communication, the terminal 300 may be further equipped with a wired network interface (for example, a LAN interface) to support wired communication.

The input/output modules may be configured to implement interaction between the terminal 300 and a user/an external environment, and may mainly include the audio input/output module 318, the key input module 316, the display 320, and the like. In a specific implementation, the input/output modules may further include a camera, a touchscreen, a sensor, and the like. The input/output modules all communicate with the terminal processor 304 through the user interface 302.

The memory 312 is coupled to the terminal processor 304, and is configured to store various software programs and/or a plurality of groups of instructions. In specific implementation, the memory 312 may include a high-speed random access memory, and may also include a non-volatile memory, for example, one or more magnetic disk storage devices, a flash memory device, or another non-volatile solid-state storage device. The memory 312 may store an operating system (referred to as a system for short below), for example, an embedded operating system such as Android, iOS, Windows, or Linux. The memory 312 may further store a network communication program. The network communication program may be used to communicate with one or more additional devices, one or more terminal devices, and one or more network devices. The memory 312 may further store a user interface program. The user interface program may use a graphical operation interface to vividly display content of an application program, and use input controls such as menus, dialog boxes, and keys to receive control operations of a user on the application program.

In some embodiments of this application, the memory 312 may be configured to store an implementation program of the transmit power control method on a terminal 300 side according to one or more embodiments of this application. For implementation of the transmit power control method provided in the one or more embodiments of this application, refer to the following embodiments.

The terminal processor 304 may be configured to read and execute computer-readable instructions. Specifically, the terminal processor 304 may be configured to invoke a program stored in the memory 312, for example, a program for implementing the transmit power control method on the terminal 300 side according to one or more embodiments of this application, and execute instructions included in the program.

The terminal processor 304 may be a modem (Modem) processor, and is a module for implementing main functions in wireless communications standards such as 3GPP and ETSI. The modem may be used as an independent chip, or may be combined with other chips or circuits to form a system-specific chip or an integrated circuit. These chips or integrated circuits may be applied to all devices that implement wireless communication functions, including a mobile phone, a computer, a notebook, a tablet, a router, a wearable device, an automobile, and a home appliance. It should be noted that, in different implementations, the processor of the terminal processor 304 may be used as an independent chip and coupled to an off-chip memory, that is, the chip does not include a memory. Alternatively, the processor of the terminal processor 304 is coupled to an on-chip memory and integrated into a chip, that is, the chip includes a memory.

It may be understood that the terminal 300 may be the terminal 103 in the wireless communications system 100 shown in FIG. 1, and may be implemented as a mobile device, a mobile station (mobile station), a mobile unit (mobile unit), a radio unit, a remote unit, a user agent, a mobile client, or the like.

It should be noted that the terminal 300 shown in FIG. 8 is merely an implementation of this application. In actual application, the terminal 300 may alternatively include more or fewer components. This is not limited herein.

Figure 9:
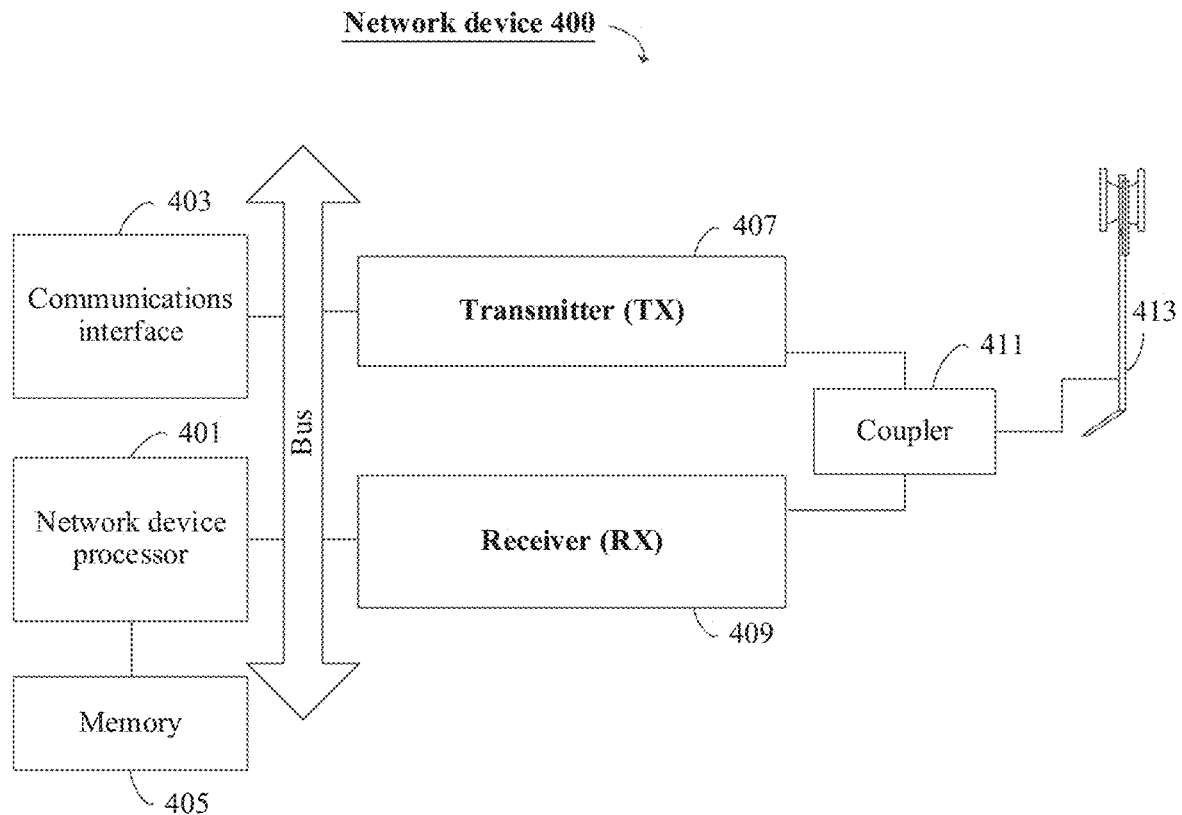
FIG. 9 is a schematic diagram of a hardware architecture of a network device according to an embodiment of this application.

FIG. 9 shows a network device 400 according to some embodiments of this application. As shown in FIG. 9, the network device 400 may include a communications interface 403, one or more network device processors 401, a transmitter 407, a receiver 409, a coupler 411, an antenna 413, and a memory 405. These components may be connected through a bus or in another manner. In FIG. 9, an example in which the components are connected through a bus is used.

The communications interface 403 may be used by the network device 400 to communicate with another communications device, for example, a terminal device or another base station. Specifically, the terminal device may be the terminal 300 shown in FIG. 8. The communications interface 301 is an interface between the network device processor 401 and a transceiver system (including the transmitter 407 and the receiver 409), for example, an S1 interface in LTE. In specific implementation, the communications interface 403 may include one or more of a global system for mobile communications (GSM) (2G) communications interface, a wideband code division multiple access (WCDMA) (3G) communications interface, a Long Term Evolution (LTE) (4G) communications interface, and the like, or may be a communications interface of 4.5G, 5G, or future new radio. In addition to a wireless communications interface, a wired communications interface 403 may be further configured on the network device 400 to support wired communication. For example, a backhaul link between a network device 400 and another network device 400 may be a wired communication connection.

The antenna 413 may be configured to convert electromagnetic energy in a transmission line into an electromagnetic wave in free space, or convert an electromagnetic wave in free space into electromagnetic energy in a transmission line. The coupler 411 may be configured to divide a mobile communication signal into a plurality of channels of signals, and allocate the plurality of channels of signals to a plurality of receivers 409.

The transmitter 407 may be configured to transmit a signal output by the network device processor 401. The receiver 409 may be configured to receive the mobile communication signal received by the antenna 413. In some embodiments of this application, the transmitter 407 and the receiver 409 may be considered as a wireless modem. In the network device 400, there may be one or more transmitters 407 and receivers 409.

The memory 405 is coupled to the network device processor 401, and is configured to store various software programs and/or a plurality of groups of instructions. In specific implementation, the memory 405 may include a high-speed random access memory, and may also include a non-volatile memory, for example, one or more magnetic disk storage devices, a flash memory device, or another non-volatile solid-state storage device. The memory 405 may store an operating system (referred to as a system for short below), for example, an embedded operating system such as uCOS, VxWorks, and RTLinux. The memory 405 may further store a network communication program. The network communication program may be used to communicate with one or more additional devices, one or more terminal devices, and one or more network devices.

The network device processor 401 may be configured to perform radio channel management, establish and release a call and a communications link, control handover of user equipment in this current control area, and the like. In a specific implementation, the network device processor 401 may include an administration module/communication module (Administration Module/Communication Module. AM/CM) (a center for speech channel switching and information exchange), a basic module (Basic Module, BM) (configured to implement call processing, message processing, radio resource management, radio link management, and circuit maintenance functions), a transcoder and sub-multiplexer (Transcoder and Sub-Multiplexer, TCSM) (configured to implement multiplexing/demultiplexing and transcoding functions), and the like.

In this application, the network device processor 401 may be configured to read and execute computer-readable instructions. Specifically, the network device processor 401 may be configured to invoke a program stored in the memory 405, for example, a program for implementing the transmit power control method on the network device 400 side according to one or more embodiments of this application, and execute instructions included in the program.

The network device processor 401 may be a modem (Modem) processor, and is a module for implementing main functions in wireless communications standards such as 3GPP and ETSI. The modem may be used as an independent chip, or may be combined with other chips or circuits to form a system-specific chip or an integrated circuit. These chips or integrated circuits may be applied to all network-side devices that implement wireless communication functions, which, for example, are referred to as an evolved NodeB (evolved NodeB, eNB or eNodeB) in an LTE network, referred to as a NodeB (NodeB) in the third generation (the 3rd Generation, 3G) network, and referred to as an NR NodeB (NR NodeB, gNB) in the 5G network. It should be noted that, in different implementations, the network device processor 401 may be used as an independent chip and coupled to an off-chip memory, that is, the chip does not include a memory. Alternatively, the processor of the network device processor 401 is coupled to an on-chip memory and is integrated into a chip, that is, the chip includes a memory.

It may be understood that the network device 400 may be the network device 101 in the wireless communications system 100 shown in FIG. 1, and may be implemented as a base transceiver station, a wireless transceiver, a basic service set (BSS), an extended service set (ESS), a NodeB, an eNodeB, or the like. The network device 400 may be implemented as several different types of base stations, for example, a macro base station, a micro base station, and the like. The network device 400 may apply different radio technologies, for example, a cell radio access technology or a WLAN radio access technology.

It should be noted that the network device 400 shown in FIG. 9 is merely an implementation of this application. In actual application, the network device 400 may alternatively include more or fewer components. This is not limited herein.

Figure 10:
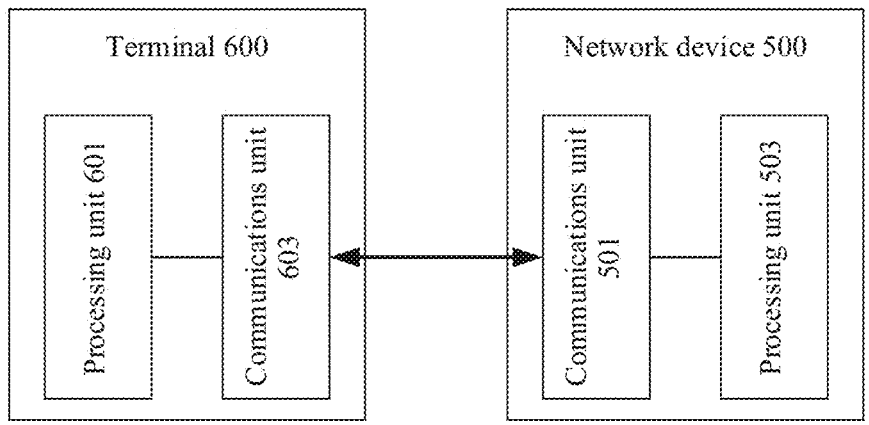
FIG. 10 is a function block diagram of a wireless communications system, a terminal, and a network device according to this application.

FIG. 10 is a schematic diagram of a structure of a wireless communications system according to an embodiment of this application. As shown in FIG. 10, a wireless communications system 10 may include a terminal 600 and a network device 500. The terminal 60) and the network device 500 may be respectively the terminal 103 and the network device 101 in the wireless communications system 100 shown in FIG. 1.

As shown in FIG. 10, the terminal 600 may include a processing unit 601 and a communications unit 603.

The communications unit 603 may be configured to receive first information sent by the network device 500. The first information may indicate a first uplink-downlink configuration.

The processing unit 601 may be configured to perform uplink transmission on some or all of uplink time resources indicated by the first uplink-downlink configuration. An actual transmit power for the uplink transmission is equal to a maximum transmit power of the terminal minus an actual power decrease and meets a specific absorption rate specification. The actual power decrease is calculated based on a first power decrease and a first power increase, and the actual power decrease is less than the first power decrease.

The first power increase is equal to a difference between a maximum transmit power that meets the specific absorption rate specification in the first uplink-downlink configuration and a maximum transmit power that meets the specific absorption rate specification in a second uplink-downlink configuration. A first uplink time proportion determined in the first uplink-downlink configuration is less than a second uplink time proportion determined in the second uplink-downlink configuration. The first power decrease is used to decrease, when the terminal is at a first distance from a human body in the second uplink-downlink configuration, a transmit power from the maximum transmit power of the terminal to the maximum transmit power that meets the specific absorption rate specification.

The terminal 600 may further include a ranging unit (not shown), which may be configured to determine the first distance. The ranging unit may be a distance sensor, a radar ranging sensor, an infrared ranging sensor, or the like. The ranging unit may be further configured to determine a distance between the terminal and the human body based on a use case (use case). For example, when it is determined that a user is making a call, and an earpiece of the terminal is turned on, the terminal may determine that the distance between the user and the terminal is within a specific distance range, for example, 0.1 mm to 1.0 mm.

The processing unit 601 may be further configured to find, from a first mapping table, a power decrease corresponding to the first distance determined by the ranging unit. The first mapping table may include a plurality of candidate distances and power decreases (deltas 1 for short) corresponding to the plurality of candidate distances. The first mapping table may be obtained according to step 1 in the conventional technology shown in FIG. 2.

The processing unit 601 may be further configured to determine the first uplink time proportion based on the first uplink-downlink configuration, and may find, from a second mapping table based on the first uplink time proportion, a power increase (namely, a power that is less decreased, and a delta 2) corresponding to the first uplink time proportion.

The second mapping table may include a plurality of candidate uplink time proportions and power increases (deltas 2 for short) corresponding to the plurality of candidate uplink time proportions. A power increase corresponding to an uplink time proportion indicates a power by which a power for the uplink time proportion is less decreased compared with a power for an all-uplink configuration.

In some embodiments, the first information may be carried in a system message (for example, a SIB 1), or may be carried in a higher layer message (for example, an RRC message), or may be carried in a PDCCH (for example, a DCI message).

In some embodiments, the communications unit 603 is further configured to: before receiving the first information, receive a UL grant sent by the network device, where the UL grant may be carried in a DCI message. The communications unit 603 may be further configured to determine, based on the UL grant, which part of the uplink time resources indicated by the first uplink-downlink configuration carry uplink data.

In some embodiments, the communications unit 603 may be further configured to send a capability report message to the network device, where the capability report message may carry second information (for example, a maxUplinkDutyCycle-PC2-FR1 IE). The second information may indicate a maximum proportion of uplink time that can be scheduled by the terminal in a SAR evaluation periodicity (for example, 6 minutes). The maximum proportion may be greater than a first value (for example, 90%). For example, the maximum proportion may be set to 100%. In this way, a proportion of the uplink time resources configured for the terminal by using the UL grant to the uplink time resources indicated by the first uplink-downlink configuration can exceed a second value (for example, may be 100%). That is, if the maximum proportion reported by the terminal is very large, for example, 100%, the proportion of the uplink time resources configured by using the UL grant delivered by the network device to the uplink time resources indicated by the first uplink-downlink configuration may be very large, for example, 100%. This helps configure more uplink time resources for the terminal, and helps the terminal to transmit more uplink data.

For specific implementation of each functional unit included in the terminal 600, refer to the foregoing method embodiments. Details are not described herein again.

As shown in FIG. 10, the network device 500 may include a processing unit 503 and a communications unit 501.

The communications unit 501 may be configured to send first information to the terminal 600.

The communications unit 501 may be further configured to receive, on some or all of uplink time resources indicated by a first uplink-downlink configuration, an uplink signal transmitted by the terminal 600.

An actual transmit power for transmitting the uplink signal by the terminal is equal to a maximum transmit power of the terminal minus an actual power decrease and meets a specific absorption rate specification. The actual power decrease is calculated based on a first power decrease and a first power increase, and the actual power decrease is less than the first power decrease. The first power increase is equal to a difference between a maximum transmit power that meets the specific absorption rate specification in the first uplink-downlink configuration and a maximum transmit power that meets the specific absorption rate specification in a second uplink-downlink configuration. A first uplink time proportion determined in the first uplink-downlink configuration is less than a second uplink time proportion determined in the second uplink-downlink configuration. The first power decrease is used to decrease, when the terminal is at a first distance from a human body in the second uplink-downlink configuration, a transmit power from the maximum transmit power of the terminal to the maximum transmit power that meets the specific absorption rate specification.

In some embodiments, the communications unit 501 may be further configured to send a UL grant to the terminal 600 before sending the first information. The UL grant may further indicate which part of the uplink time resources indicated by the first uplink-downlink configuration carry the uplink signal. The UL grant may be carried in a DCI message.

In some embodiments, the communications unit 501 may be further configured to receive a capability report message sent by the terminal 600, where the capability report message may carry second information (for example, a maxUplinkDutyCycle-PC2-FR1 IE). The second information may indicate a maximum proportion of uplink time that can be scheduled by the terminal in a SAR evaluation periodicity (for example, 6 minutes). The maximum proportion may be greater than a first value (for example, 90%). For example, the maximum proportion may be set to 100%. In this way, a proportion of the uplink time resources configured for the terminal by using the UL grant to the uplink time resources indicated by the first uplink-downlink configuration can exceed a second value (for example, may be 100%). That is, if the maximum proportion reported by the terminal is very large, for example, 100%, the proportion of the uplink time resources configured by using the UL grant delivered by the network device to the uplink time resources indicated by the first uplink-downlink configuration may be very large, for example, 100%. This helps configure more uplink time resources for the terminal, and helps the terminal to transmit more uplink data.

For specific implementation of each functional unit included in the network device 500, refer to the foregoing method embodiments. Details are not described herein again.

In the terminal 600 and the network device 500, the processing unit may be a processor or a controller. The processor/controller may implement or execute various example logical blocks, modules, and circuits described with reference to content disclosed in this application. The processor may alternatively be a combination, for example, a combination including one or more microprocessors or a combination of a digital signal processor (digital signal processor, DSP) and a microprocessor, for implementing a computing function. The storage unit may be a memory. The communications unit may be specifically a device that communicates with another electronic device, for example, a radio frequency circuit, a Bluetooth chip, and a Wi-Fi chip.

Figure 11:
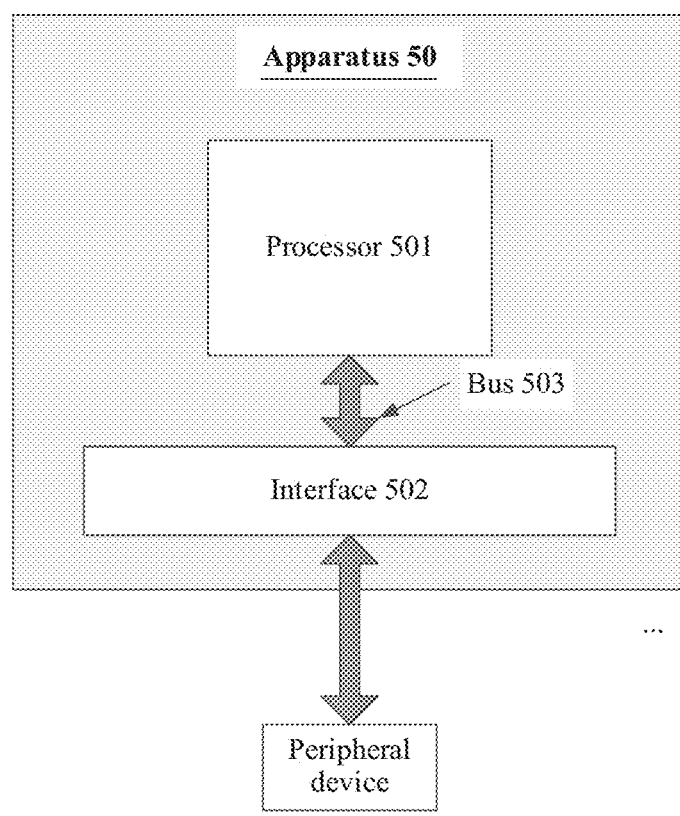
FIG. 11 is a schematic diagram of a structure of a processor according to this application.

FIG. 11 is a schematic diagram of a structure of an apparatus according to this application. As shown in FIG. 11, an apparatus 50 may include a processor 501 and one or more interfaces 502 coupled to the processor 501.

The processor 501 may be configured to read and execute computer-readable instructions. During specific implementation, the processor 501 may mainly include a controller, an arithmetic unit, and a register. The controller is mainly responsible for decoding an instruction, and sends a control signal for an operation corresponding to the instruction. The arithmetic unit is mainly responsible for performing a fixed-point or floating-point arithmetic operation, a shift operation, a logic operation, and the like, or may perform an address operation and address conversion. The register is mainly responsible for storing a quantity of register operations, intermediate operation results, and the like that are temporarily stored during instruction execution. During specific implementation, a hardware architecture of the processor 501 may be an application-specific integrated circuit (Application-Specific Integrated Circuit, ASIC) architecture, an MIPS architecture, an ARM architecture, an NP architecture, or the like. The processor 501 may be a single-core processor, or may be a multi-core processor.

The interface 502 may be configured to input to-be-processed data to the processor 501, and may output a processing result of the processor 501. During specific implementation, the interface 502 may be a general-purpose input/output (General-Purpose Input/Output, GPIO) interface, and may be connected to a plurality of peripheral devices (for example, radio frequency modules). The interface 502 may further include a plurality of independent interfaces, for example, an Ethernet interface and a mobile communications interface (for example, an X1 interface), which are separately responsible for communication between different peripheral devices and the processor 501.

In this application, the processor 501 may be configured to invoke, from a memory, a program for implementing the transmit power control method on a network device side or a terminal side according to one or more embodiments of this application, and execute instructions included in the program. The interface 502 may be configured to output an execution result of the processor 501. In this application, the interface 502 may be specifically configured to output the processing result of the processor 501. For the transmit power control method provided in one or more embodiments of this application, refer to the foregoing embodiments. Details are not described herein again.

Specifically, when the apparatus 50 is implemented as the terminal in this application, the interface 503 may be configured to input the first information (indicating the first uplink-downlink configuration) received by the receiver to the processor 501, and the processor 501 may be configured to determine a power decrease that can be reduced in the uplink-downlink configuration compared with that in an all-uplink configuration, to determine the actual power decrease.

Specifically, when the apparatus 50 is implemented as the network device in this application, the processor 501 may be configured to determine the first uplink-downlink configuration, and generate the first information. The interface 503 may output the first information (indicating the first uplink-downlink configuration) to the transmitter, and the transmitter may be configured to transmit the first information (indicating the first uplink-downlink configuration).

For a configuration mode of the first uplink-downlink configuration and a manner of determining the actual power decrease, refer to the foregoing embodiments. Details are not described herein again.

It should be noted that functions corresponding to the processor 501 and the interface 502 may be implemented by using a hardware design, or may be implemented by using a software design, or may be implemented by using a combination of software and hardware. This is not limited herein.

All or some of the foregoing embodiments may be implemented by software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, all or some of the procedure or functions according to the embodiments of this application are generated.

The computer may be a general purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (Solid State Drive, SSD)), or the like.

The foregoing descriptions about implementations allow a person skilled in the art to clearly understand that, for the purpose of convenient and brief description, division into only the foregoing function modules is used as an example for illustration. In actual application, the foregoing functions can be allocated to different function modules for implementation based on a requirement. That is, an inner structure of an apparatus is divided into different function modules to implement all or some of the functions described above.

In the several embodiments provided in this application, it should be understood that the disclosed apparatus and method may be implemented in other manners. For example, the described apparatus embodiments are merely examples. For example, division into the modules or units is merely logical function division, and may be other division during actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate components may or may not be physically separate, and components displayed as units may be one or more physical units, that is, may be located in one place, or may be distributed on a plurality of different places. Some or all of the units may be selected based on an actual requirement to achieve an objective of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of the embodiments of this application essentially, or the part contributing to the current technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods in the embodiments of this application. The foregoing storage medium includes; any medium that can store program code, such as a USB flash drive, a removable hard disk, a read-only memory (Read-Only Memory, ROM), a random access memory (Random Access Memory. RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method implemented by a terminal, wherein the method comprises:
   receiving, from a network device, first information indicating a first uplink-downlink configuration; and
   performing uplink transmission on a plurality of uplink time resources indicated by the first uplink-downlink configuration,
   wherein an actual transmit power for the uplink transmission is equal to a first difference between a first maximum transmit power of the terminal and an actual power decrease and meets a specific absorption rate (SAR) specification,
   wherein the actual power decrease is based on a first power decrease and a first power increase and is less than the first power decrease,
   wherein the first power increase is equal to a second difference between a second maximum transmit power in the first uplink-downlink configuration that meets the SAR specification and a third maximum transmit power in a second uplink-downlink configuration that meets the SAR specification,
   wherein a first uplink time proportion in the first uplink-downlink configuration is less than a second uplink time proportion in the second uplink-downlink configuration, and
   wherein the first power decreases a transmit power from the first maximum transmit power to a fourth maximum transmit power that meets the SAR specification when the terminal is at a first distance from a human body in the second uplink-downlink configuration.

2. The method of claim 1, wherein the second uplink time proportion is 100%.

3. The method of claim 2, wherein the first power decrease is equal to a third difference between the first maximum transmit power and a measured power, and wherein the measured power is a fifth maximum transmit power that meets the SAR specification and that is measured during performing continuous uplink transmission when the terminal is at the first distance.

4. The method of claim 1, further comprising searching the first power decrease in a first mapping table based on the first distance, wherein the first mapping table comprises power decreases corresponding to a plurality of candidate distances, and wherein the candidate distances comprise the first distance.

5. The method of claim 1, further comprising searching the first power increase in a second mapping table based on the first uplink time proportion, wherein the second mapping table comprises power increases corresponding to a plurality of candidate uplink time proportions, and wherein the candidate uplink time proportions comprise the first uplink time proportion.

6. The method of claim 1, further comprising determining the first distance.

7. The method of claim 1, wherein the actual power decrease is equal to a fourth difference between the first power decrease and the first power increase.

8. The method of claim 1, wherein the first information is carried in one or more of a system information block (SIB), a Radio Resource Control (RRC) message, or a downlink control information (DCI) message.

9. The method of claim 1, further comprising sending, to the network device, a capability report message carrying second information, wherein the second information indicates a maximum proportion of uplink time that can be scheduled in an evaluation periodicity of the SAR specification, and wherein the maximum proportion is greater than a first value.

10. The method of claim 9, further comprising receiving, from the network device, an uplink grant, wherein a proportion of the uplink time resources configured by the uplink grant to the uplink time resources is greater than a second value.

11. A terminal comprising:
    a memory configured to store instructions; and
    a processor coupled to the memory, wherein the instructions cause the processor to be configured to:
      receive, from a network device, first information indicating a first uplink-downlink configuration; and
      perform uplink transmission on a plurality of uplink time resources indicated by the first uplink-downlink configuration,
      wherein an actual transmit power for the uplink transmission is equal to a first difference of first maximum transmit power of the terminal and an actual power decrease and meets a specific absorption rate (SAR) specification,
      wherein the actual power decrease is based on a first power decrease and a first power increase and is less than the first power decrease,
      wherein the first power increase is equal to a second difference between a second maximum transmit power in the first uplink-downlink configuration that meets the SAR specification and a third maximum transmit power in a second uplink-downlink configuration that meets the SAR specification,
      wherein a first uplink time proportion in the first uplink-downlink configuration is less than a second uplink time proportion in the second uplink-downlink configuration, and
      wherein the first power decreases a transmit power from the first maximum transmit power to a fourth maximum transmit power that meets the SAR specification when the terminal is at a first distance from a human body in the second uplink-downlink configuration.

12. The terminal of claim 11, wherein the second uplink time proportion is 100%.

13. The terminal of claim 12, wherein the first power decrease is equal to a third difference between the first maximum transmit power and a measured power, and wherein the measured power is a fifth maximum transmit power that meets the SAR specification and that is measured during performing continuous uplink transmission when the terminal is at the first distance.

14. The terminal of claim 11, wherein the instructions further cause the processor to be configured to search the first power decrease in a first mapping table based on the first distance, wherein the first mapping table comprises power decreases corresponding to a plurality of candidate distances, and wherein the candidate distances comprise the first distance.

15. The terminal of claim 11, wherein the instructions further cause the processor to be configured to search the first power increase in a second mapping table based on the first uplink time proportion, wherein the second mapping table comprises power increases corresponding to a plurality of candidate uplink time proportions, and wherein the candidate uplink time proportions comprise the first uplink time proportion.

16. The terminal of claim 11, wherein the instructions further cause the processor to be configured to determine the first distance.

17. The terminal of claim 11, wherein the actual power decrease is equal to a fourth difference between the first power decrease and the first power increase.

18. The terminal of claim 11, wherein the first information is carried in one or more of a system information block (SIB), a Radio Resource Control (RRC) message, or a downlink control information (DCI) message.

19. The terminal of claim 11, wherein the instructions further cause the processor to be configured to send, to the network device, a capability report message carrying second information, wherein the second information indicates a maximum proportion of uplink time that can be scheduled in an evaluation periodicity of the SAR specification, and wherein the maximum proportion is greater than a first value.

20. The terminal of claim 11, wherein the instructions further cause the processor to be configured to receive, from the network device, an uplink grant, wherein a proportion of the uplink time resources configured by the uplink grant to the uplink time resources is greater than a second value.

* * * * *